US008471927B2

(12) United States Patent
Imagawa et al.

(10) Patent No.: US 8,471,927 B2
(45) Date of Patent: Jun. 25, 2013

(54) IMAGE PROCESSING DEVICE, IMAGE GENERATING SYSTEM, METHOD, AND PROGRAM

(75) Inventors: Taro Imagawa, Osaka (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 141 days.

(21) Appl. No.: 13/239,653

(22) Filed: Sep. 22, 2011

(65) Prior Publication Data

US 2012/0057049 A1 Mar. 8, 2012

Related U.S. Application Data

(63) Continuation of application No. PCT/JP2010/007578, filed on Dec. 27, 2010.

(30) Foreign Application Priority Data

Jan. 7, 2010 (JP) .................................. 2010-001906

(51) Int. Cl.
*H04N 9/68* (2006.01)
(52) U.S. Cl.
USPC ........................................................ 348/234
(58) Field of Classification Search
USPC .................... 348/154, 155, 208.1, 220.1, 234, 348/208.13, 221.1; 382/103, 107, 173, 181
See application file for complete search history.

(56) References Cited

U.S. PATENT DOCUMENTS

| 8,311,367 | B2 * | 11/2012 | Murashita et al. ............ 382/294 |
| 2007/0189386 | A1 | 8/2007 | Imagawa et al. |
| 2007/0201149 | A1 | 8/2007 | Nishioka |
| 2008/0024653 | A1 | 1/2008 | Ikeda |
| 2009/0167909 | A1 | 7/2009 | Imagawa et al. |
| 2009/0263044 | A1 | 10/2009 | Imagawa et al. |
| 2010/0026825 | A1 | 2/2010 | Doida |
| 2010/0149381 | A1 | 6/2010 | Motomura et al. |
| 2010/0194911 | A1 | 8/2010 | Motomura et al. |

FOREIGN PATENT DOCUMENTS

| JP | 05-347730 A | 12/1993 |
| JP | 4215267 B | 11/2008 |
| WO | 2008/053765 A1 | 5/2008 |
| WO | 2008/090730 A1 | 7/2008 |
| WO | 2009/019808 A1 | 2/2009 |

OTHER PUBLICATIONS

International Search Report for corresponding International Application No. PCT/JP2010/007578 mailed Mar. 29, 2011.
P. Anandan, "A Computational Framework and an Algorithm for the Measurement of Visual Motion", International Journal of Computer Vision, vol. 2 (1989), pp. 283-310.
Zelnik-Manor et al., "Multi-body Segmentation: Revisiting Motion Consistency", ECCV (2002), pp. 1-12.

\* cited by examiner

*Primary Examiner* — Yogesh Aggarwal
(74) *Attorney, Agent, or Firm* — Renner, Otto, Boisselle & Sklar, LLP

(57) ABSTRACT

An image generation device includes an image acquisition section for acquiring the first and second moving images having different resolutions and different frame rates or different exposure times; a light amount determination section for determining whether each pixel is saturated or blocked-up-shadowed; and an image processing section for generating, from the moving images, a new moving image having a frame rate which is equal to or higher than the frame rate of the moving images and having a resolution of each frame image which is equal to or higher than the resolution of the moving images. For a pixel not determined as being saturated or being blocked-up-shadowed, the image processing section generates a new moving image fulfilling a first condition; and for a pixel determined as being saturated or being blocked-up-shadowed, the image processing section generates a new moving image which does not fulfill the first condition.

22 Claims, 25 Drawing Sheets

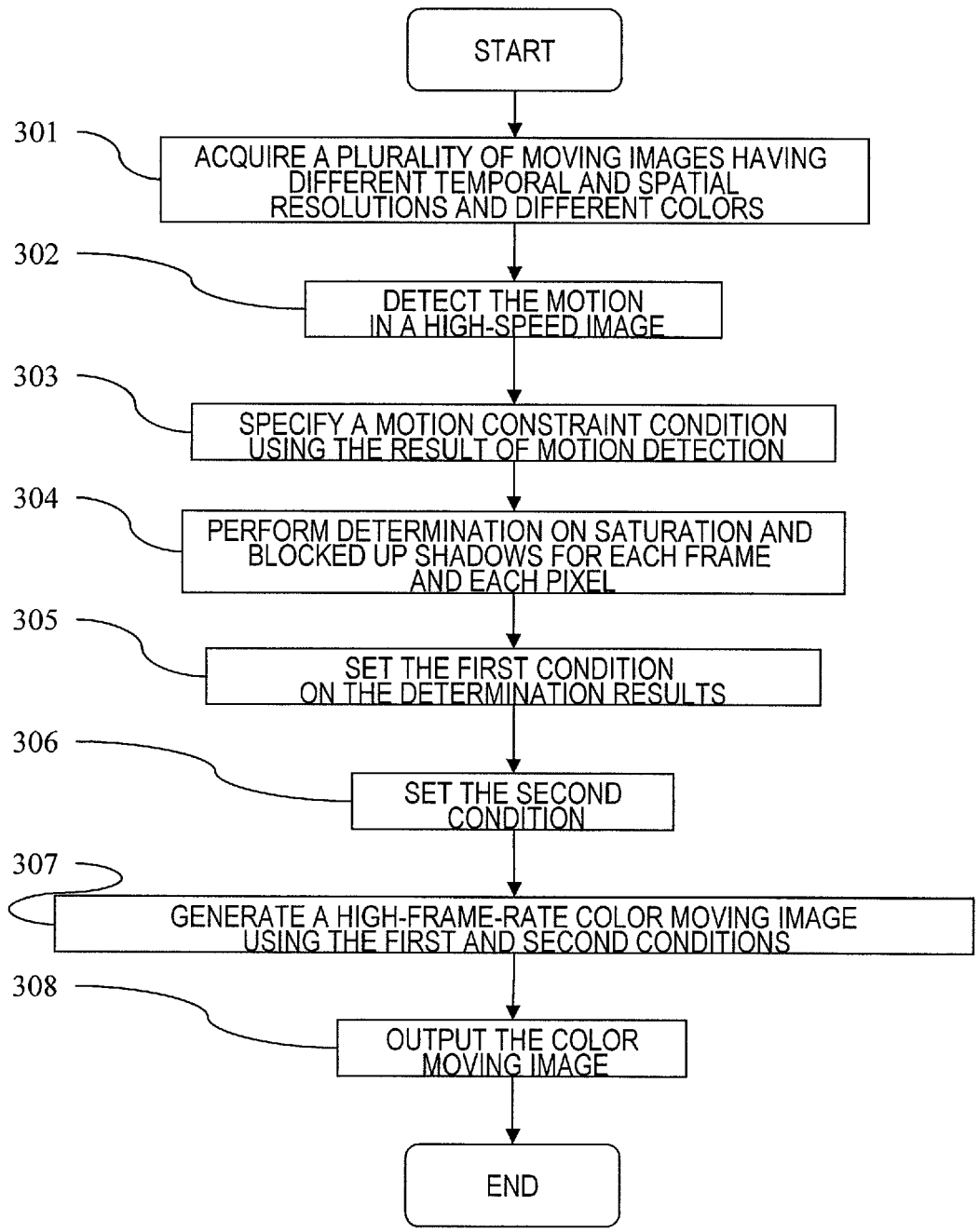

*FIG.4A*
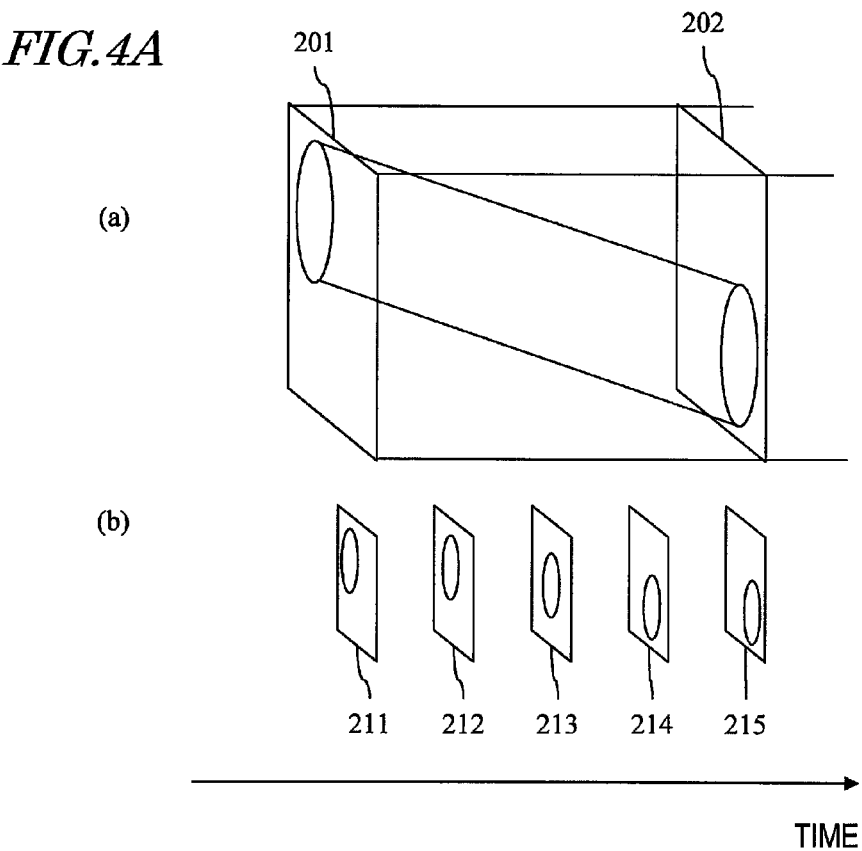
*FIG.4B*
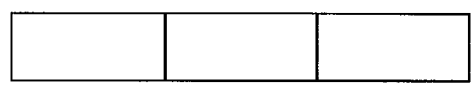

HH(x,y,t)

HL($x_L, y_L, t$)

LH($x, y, t_L$)

*FIG.12*
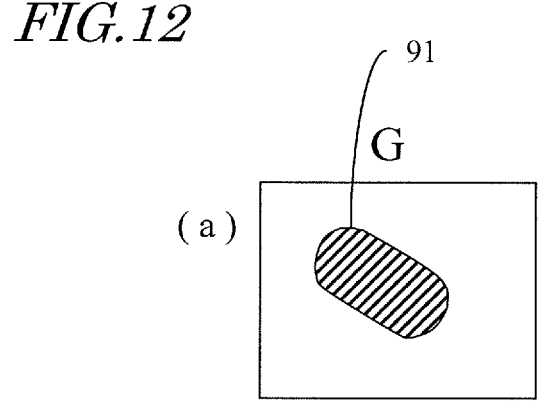
(a)
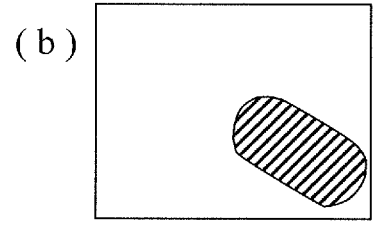
(b)

FIG.15
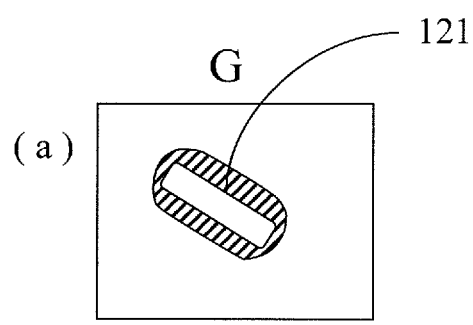
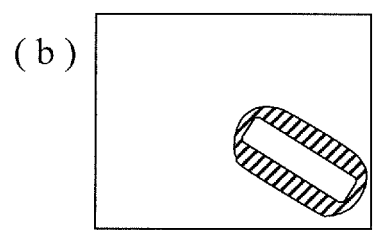

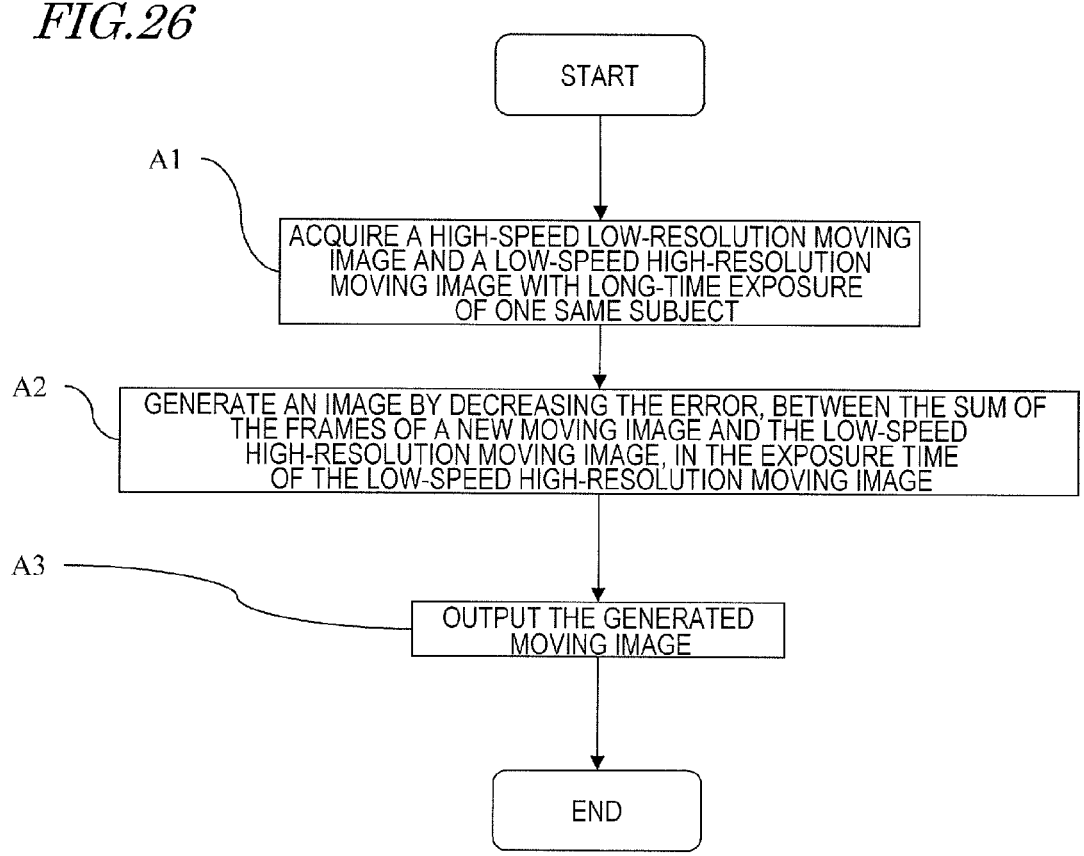

IMAGE PROCESSING DEVICE, IMAGE GENERATING SYSTEM, METHOD, AND PROGRAM

This is a continuation of International Application No. PCT/JP2010/007578, with an international filing date of Dec. 27, 2010, which claims priority of Japanese Patent Application No. 2010-001906, filed on Jan. 7, 2010, the contents of which are hereby incorporated by reference.

FIELD OF THE INVENTION

The present invention relates to image processing for generating a moving image, and specifically to image processing for generating, from a plurality of moving images obtained by shooting one same subject under different shooting conditions, a new moving image representing the subject.

DESCRIPTION OF THE RELATED ART

Owing to the size reduction of pixels, the number of pixels included in imagers has been increasing and the size of the imagers has been decreasing. As a result, high-resolution imaging can be realized by a compact and low-cost camera. The size reduction of pixels reduces the light receiving area size of each pixel. This causes a problem that the noise is relatively increased (the S/N ratio is lowered). Especially, for shooting a still image or a moving image of a moving subject, the exposure time cannot be made long. Therefore, the problem of the reduction of the S/N ratio (deterioration of image quality) due to an insufficient light amount is conspicuous.

As a measure against this problem, it is conceived to brighten the image shot with an insufficient light amount by electrically amplifying a signal after the light is received. However, this method also amplifies noise and so does not improve the S/N ratio. It is also conceived to extend the exposure time to increase the amount of light received. However, this method cannot provide a clear image because when the subject moves, the image blurs. It is also conceived to increase the size of the optical system including a lens and the like in order to increase the amount of light received, but this causes problems of increasing the cost and lowering the portability.

One conventional device for obtaining a high-resolution moving image under the condition of an insufficient light amount is an image generation device for generating a new moving image using a still image with a long exposure time and a moving image which are acquired by shooting one same subject (see, for example, Japanese Patent Publication No. 4215267). FIG. 26 is a flowchart showing a processing procedure of the conventional image generation device described in Japanese Patent Publication No. 4215267. In step A1 in FIG. 26, a high-speed low-resolution moving image and a low-speed high-resolution image with a long exposure time which are acquired by shooting one same subject. In step A2, an error, between the sum of frames of a new moving image and the low-speed high-resolution image, in the exposure time of the low-speed high-resolution image is reduced to generate an image. In step A3, the generated image is output.

With the structure of the above-described image generation device, images are shot with a long exposure time. Therefore, when a subject is shot with a large light amount, pixel saturation may occur in the area of the subject. In an area of saturated pixels, the addition value of frames of an image to be obtained is larger than the saturated pixel value. Therefore, when an image is generated such that an error between the addition value of the frames and the pixel value (saturated pixel value) of an input image is decreased by the conventional method, contradiction occurs. Thus, the quality of the generated image is lowered, and a luminance error or a false color may be generated.

SUMMARY OF INVENTION

The present invention made to solve the conventional problems has an object of, when a high-resolution high-frame-rate image is to be obtained from an image shot with a sufficient exposure value by long-time exposure or the like, providing a high quality image even when saturation occurs.

An image generation device according to the present invention is an image generation device for generating, from a first moving image, which is a moving image of a first color component of a subject, and a second moving image, which is a moving image of a second color component of the subject, a new moving image representing the subject. The image generation device includes an image acquisition section for acquiring the first moving image and the second moving image having different resolutions and different frame rates or different exposure times from each other; a light amount determination section for determining, based on a pixel value of each of pixels in each of frame images of the first moving image and the second moving image, whether or not each pixel is saturated or blocked-up-shadowed; and an image processing section for generating, from the first moving image and the second moving image, a new moving image having a frame rate which is equal to or higher than the frame rate of the first moving image and the second moving image and having a resolution of each frame image which is equal to or higher than the resolution of the first moving image and the second moving image; wherein for a pixel not determined by the light amount determination section as being saturated or being blocked-up-shadowed, the image processing section generates a new moving image fulfilling a first condition which indicates that an error between a pixel value of each of the acquired first moving image and second moving image and a sum of pixel values of frame images of the new moving image corresponding to the pixel value temporally and spatially is smaller than a prescribed value, and for a pixel determined by the light amount determination section as being saturated or being blocked-up-shadowed, the image processing section generates a new moving image which does not fulfill the first condition.

The first color component may be at least one of red and blue, and the second color component may be green.

When a light amount at each pixel is equal to or greater than a predefined saturation value, the light amount determination section may determine that the pixel is saturated.

When a light amount at each pixel is equal to or less than a predefined value for blocked up shadows, the light amount determination section may determine that the pixel is blocked-up-shadowed.

The saturation value may be set for each of the first color component and the second color component.

The value for the blocked up shadows may be set for each of the first color component and the second color component.

When the light amount determination section determines that a pixel is saturated, the image processing section may decrease the pixel value of the pixel, and when the light amount determination section determines that a pixel is block-up-shadowed, the image processing section may increase the pixel value of the pixel.

The image generation device may further include a second condition setting section for setting a second condition regarding temporal and spatial continuity which indicates that colors of pixels adjacent to each other temporally and spatially in the new moving image to be generated need to be continuous. The image processing section may generate a new moving image fulfilling the second condition.

The second condition setting section may set the second condition regarding the temporal and spatial continuity separately for a signal strength and a color of the pixel.

The second condition setting section may determine a weight to be applied, at a pixel position of each pixel in the new moving image, to the second condition to be set, and sets the second condition while decreasing the weight at the pixel position where a spatial differential value of the acquired first or second moving image is large.

The second condition setting section may set the second condition while making the weight for the temporal and spatial continuity of the color of the pixel larger than the weight for the temporal and spatial continuity of the signal strength of the pixel.

The second condition setting section may set the second condition regarding the temporal and spatial continuity for each of a direction chosen in accordance with the magnitude of dispersion of the pixel values in a color space of each of the acquired images and a direction perpendicular to the chosen direction.

The second condition setting section may set the second condition for the pixel position of the pixel determined by the light amount determination section as being saturated or blocked-up-shadowed more strongly than for the pixel position of the pixel not determined by the light amount determination section as being saturated or blocked-up-shadowed.

The image generation device may further include a light amount control section for adjusting an exposure value of an imaging device for imaging the first moving image and the second moving image. When the light determination section determines that all the colors at the same position of the frames are saturated regarding each of the first moving image and the second moving image, the light amount control section may decrease the exposure value for acquiring a moving image of a part of the color components.

When the light determination section determines that all the colors at the same position of the frames are saturated, the light amount control section may decrease the exposure value of the imaging device at the time of imaging a moving image of at least one color component.

The image generation device may further include a motion detection section for detecting a motion of each of the acquired images; and a third condition setting section for setting a third condition which indicates that pixel values along a motion vector in the new moving image to be generated match each other based on a result of the motion detection. The image processing section may generate a new moving image fulfilling the third condition.

The third conditions setting section may set the third condition for the pixel position of the pixel determined by the light amount determination section as being saturated or blocked-up-shadowed more strongly than for the pixel position of the pixel not determined by the light amount determination section as being saturated or blocked-up-shadowed.

An image generation system according to the present invention includes an imaging device; a storage device for recording an image shot by the imaging device; and the image generation device of claim 1 for generating the new moving image using the image in the storage device.

Another image generation system according to the present invention includes the above-described image generation device; and a display device for displaying the new moving image generated by the image generation device.

The image generation device may acquire a signal of each of the first moving image and the second moving image via at least one of a memory card, an antenna and a network.

An image generation method according to the present invention is an image generation method for generating, from a first moving image, which is a moving image of a first color component of a subject, and a second moving image, which is a moving image of a second color component of the subject, a new moving image representing the subject. The image generation method includes the steps of acquiring the first moving image and the second moving image having different resolutions and different frame rates or different exposure times from each other; determining, based on a pixel value of each of pixels in each of frame images of the first moving image and the second moving image, whether or not each pixel is saturated or blocked-up-shadowed; and generating, from the first moving image and the second moving image, a new image having a frame rate which is equal to or higher than the frame rate of the first moving image and the second moving image and having a resolution of the frame images which is equal to or higher than the resolution of the first moving image and the second moving image; wherein for a pixel not determined in the step of determining as being saturated or being blocked-up-shadowed, the step of generating a new image generates a new moving image fulfilling a first condition which indicates that an error between a pixel value of each of the acquired first moving image and second moving image and a sum of pixel values, of frame images of the new moving image, corresponding to the pixel values temporally and spatially is smaller than a prescribed value, and for a pixel determined in the step of determining as being saturated or being blocked-up-shadowed, the step of generating a new image generates a new moving image which does not fulfill the first condition.

A computer program according to the present invention is a computer program executable by a computer of an image generation device for generating, from a first moving image, which is a moving image of a first color component of a subject, and a second moving image, which is a moving image of a second color component of the subject, a new moving image representing the subject. The computer program causes the computer to execute the steps of acquiring the first moving image and the second moving image having different resolutions and different frame rates or different exposure times from each other; determining, based on a pixel value of each of pixels in each of frame images of the first moving image and the second moving image, whether or not each pixel is saturated or blocked-up-shadowed; and generating, from the first moving image and the second moving image, a new image having a frame rate which is equal to or higher than the frame rate of the first moving image and the second moving image and having a resolution of the frame images which is equal to or higher than the resolution of the first moving image and the second moving image; wherein for a pixel not determined in the step of determining as being saturated or being blocked-up-shadowed, the step of generating a new image generates a new moving image fulfilling a first condition which indicates that an error between a pixel value of each of the acquired first moving image and second moving image and a sum of pixel values, of frame images of the new moving image, corresponding to the pixel values temporally and spatially is smaller than a prescribed value, and for a pixel determined in the step of determining as being saturated or being blocked-up-shadowed, the step of generating a new image generates a new moving image which does not fulfill the first condition.

According to the image generation device of the present invention, a moving image is generated while an error between the sum of a plurality of frame of the moving image to be generated and a still image is tolerated for an image area saturated due to long-time exposure or the like. Owing to this, the moving image generated in correspondence to the saturated area has an improved quality.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 is a flowchart showing a processing procedure executed by the image generation device 30.

FIGS. 4A(a) and (b) show the relationship between a high-speed low-resolution moving image acquired by a high-speed image acquisition section 101a and a low-speed high-resolution moving image acquired by a low-speed image acquisition section 101b.

FIG. 4B shows the relationship between the exposing timing of the low-speed high-resolution moving image and that of the high-speed low-resolution moving image.

FIGS. 12(a) and (b) show an example of images of one same subject shot with different colors when saturation does not occur.

FIGS. 15(a) and (b) show an example of images of the subject at the same positions as those in FIG. 12 when there is a saturated area 121 in the G image.

FIG. 26 is a flowchart showing a processing procedure of a conventional image generation device described in Patent Document 1.

DETAILED DESCRIPTION OF PREFERRED EMBODIMENTS

Hereinafter, an image generation device in embodiments according to the present invention will be described with reference to the attached drawings.

(Embodiment 1)

Figure 1:
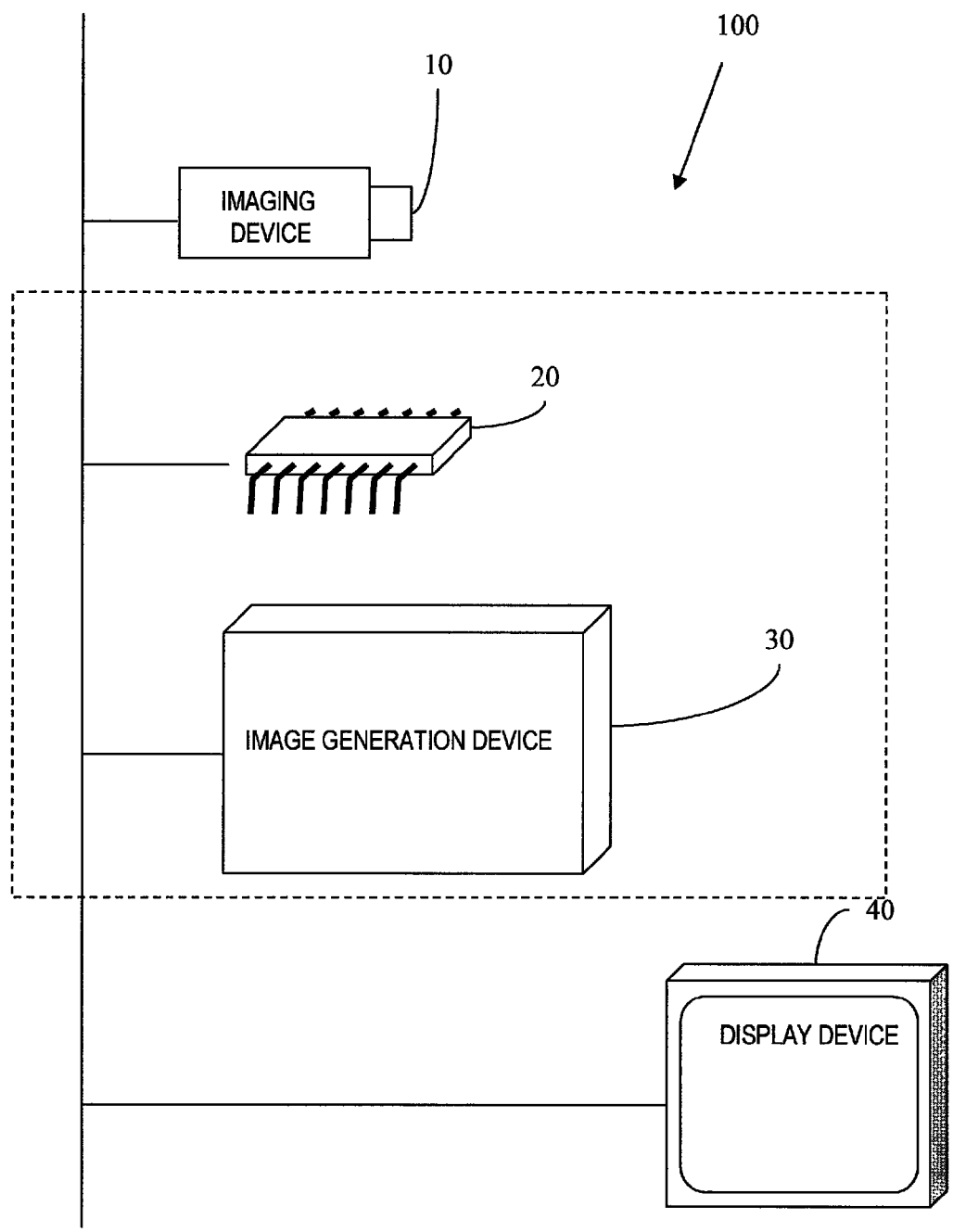
FIG. 1 is a block diagram showing a hardware structure of an image generation system 100 in Embodiment 1.

FIG. 1 is a block diagram showing a hardware structure of an image generation system 100 in this embodiment. The image generation system 100 generates a new color moving image having high temporal and spatial resolutions from a plurality of moving images of different color components obtained by shooting one same subject with different exposure times and different frame rates. In this embodiment, an example of generating a high-speed, high-resolution image from a high-speed low-resolution image and a low-speed high-resolution image will be described.

The image generation system 100 includes an imaging device 10, an image storage device 20, an image generation device 30, and a display device 40.

The imaging device 10 is, for example, a camera, and shoots a subject under different shooting conditions and obtains moving images with two different types of temporal resolution and two different types of spatial resolution. The "moving images" refers to moving images of one same subject, which are a high-speed low-resolution moving image (moving image having a relatively high temporal resolution (frame rate) and a relatively low spatial resolution) and a low-speed high-resolution moving image (moving image having a relatively low temporal resolution and a relatively high spatial resolution).

The image storage device 20 is, for example, a semiconductor memory, and temporarily stores the moving images imaged by the imaging device 10.

The image generation device 30 is, for example, an image processing circuit (graphic controller) realized by hardware. The image generation device 30 may be produced and/or marketed as an independent product. When being incorporated as a part of the image generation system 1, the image generation device 30 reads the moving images stored on the image storage device 20 and generates a new moving image having improved temporal and spatial resolutions from the plurality of moving images read. In the above-described example, the image generation device 30 is realized by hardware such as a dedicated circuit or the like, but alternatively may be realized by a general-purpose processor and software such as an image processing program or the like.

The display device 40 is, for example, a liquid crystal display device, and displays the new moving image generated by the image generation device 30.

As represented by the dashed line in FIG. 1, the image storage device 20 and the image generation device 30 may be realized by hardware such as, for example, a personal computer or the like.

Figure 2:
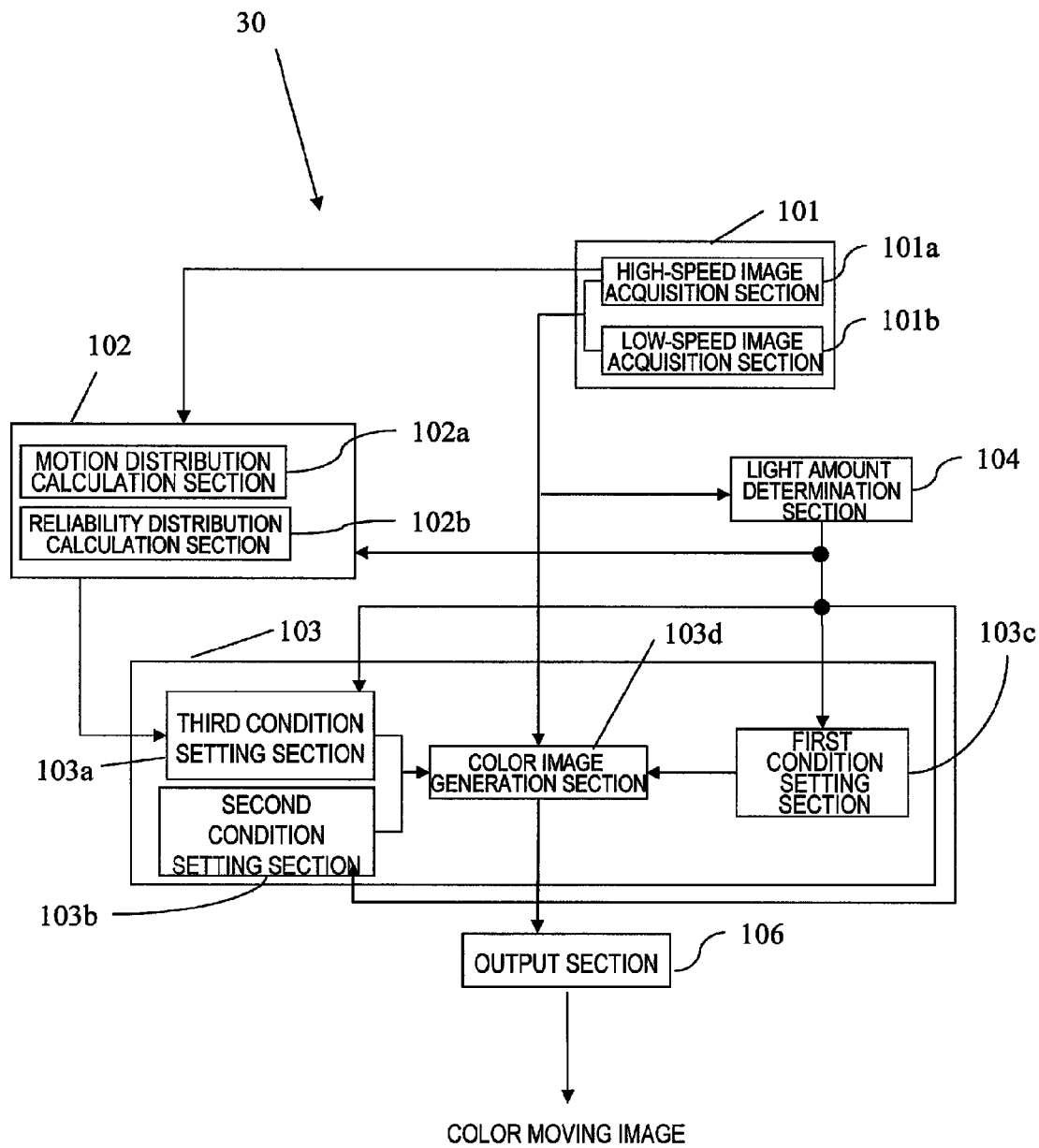
FIG. 2 is a functional block diagram showing an internal structure of an image generation device 30 shown in FIG. 1.

FIG. 2 is a functional block diagram showing an internal structure of the image generation device 30 shown in FIG. 1. The image generation device 30 includes an image acquisition section 101, a motion detection section 102, an image processing section 103, a light amount determination section 104, and an output section 106.

The image acquisition section 101 acquires moving images having different temporal and spatial resolutions and different colors which are obtained by imaging one same subject. The image acquisition section 101 includes a high-speed image acquisition section 101a and a low-speed image acquisition section 101b. In this embodiment, the high-speed image acquisition section 101a acquires a moving image of a red component (R) and a moving image of a blue component (B) obtained by shooting a subject with a high speed (high frame rate) and a low spatial resolution (in this embodiment, a moving image of each of these color components will be referred to as the "high-speed low-resolution moving image"). The low-speed image acquisition section 101b acquires a moving image of a green component (G) obtained by shooting the same subject as the high-speed image acquisition section 101a with a low speed (low frame rate) and a high spatial resolution (in this embodiment, a moving image of the green component (G) will be referred to as the "low-speed high-resolution moving image").

As described above, the image input to the high-speed image acquisition section 101a and the image input to the low-speed image acquisition section 101b are of one same subject although being different in the temporal and spatial resolutions and the color. The combination of the color with which the high-speed low-spatial-resolution moving image is shot, and the other color with which the low-speed high-spatial-resolution moving images are shot, are merely examples. Any combination of colors is usable as long as a moving image is shot for each wavelength band of light, namely, for each color component. In this specification, the green component will be described simply as "green" or "G".

The motion detection section 102 includes a motion distribution calculation section 102a and a reliability distribution calculation section 102b. The motion detection section 102 performs image motion detection in the input image and calculates the reliability of the motion detection, and outputs the results. More specifically, the motion distribution calculation section 102a performs motion detection on an image of a part (typically, the subject) of the acquired image based on the image input to the image acquisition section 101. In the end, the motion detection is performed on the entire image of each frame. The reliability distribution calculation section 102b calculates the reliability of the motion detection performed by the motion distribution calculation section 102a regarding the entire image of each frame. The motion distribution calculation section 102a will be described specifically later.

The image processing section 103 generates a color moving image having a high color resolution and a high frame rate from a plurality of moving images acquired by the image acquisition section 101.

More specifically, the image processing section 103 includes a third condition setting section 103a, a second condition setting section 103b, a first condition setting section 103c, and a color image generation section 103d. The first through third condition setting sections each set the relationship (condition) which should be fulfilled by the acquired moving images and the moving image to be newly generated.

In this specification, the moving image to be newly generated is referred to also as the "target moving image". The "target moving image" is a color moving image. However, in the following description, the "target moving image" may refer to an image of one frame included in the moving image, depending on the context.

The third condition setting section 103a sets a constraining condition on the target moving image using the results of the motion detection and the reliability of the motion detection acquired from the motion detection section 102. The second condition setting section 103b sets a spatial constraining condition on the target moving image. The first condition setting section 103c sets the relationship between the pixel value of the target moving image and the pixel value of the acquired moving images (condition for deteriorating the target moving image to the acquired moving images). The color image generation section 103d generates one color moving image from a plurality of moving images of different color components using the above-mentioned constraining conditions.

In this specification, the term "set" used for the first condition, the second condition and the like does not mean setting each condition independently. As described later, an evaluation function J including a plurality of conditions is set, and a moving image which minimizes the evaluation function J is output as the target moving image (new moving image). A reason for this is that it is estimated that a moving image which minimizes the evaluation function J fulfills, comprehensively well, the condition that the value of each constraining condition is decreased. In this specification, a determination that the value of each condition is decreased to a maximum possible degree is made based on the estimation. Various conditions will be described later, but it should be noted that the values set below are not to be fulfilled independently.

The light amount determination section 104 determines whether or not saturation or blocked up shadows have arisen regarding each pixel value in each frame of the moving images acquired from the image acquisition section 101.

The output section 106 is an output terminal of the image generation device 30. Where, for example, the image generation device 30 is an image processing circuit (graphic controller), the output section 106 is a connector connectable with a bus. The output section 106 outputs data of the color image generated by the image processing section 103 to outside. The data is output to, for example, the display device 40.

In this specification, the term "frame" encompasses a frame in the progressive method and also an even field and an odd field in the interface method.

Now, processing executed by the image generation device 30 having the above-described structure will be described. FIG. 3 is a flowchart showing a processing procedure executed by the image generation device 30.

In step 301, the image acquisition section 101 acquires a plurality of moving images having different temporal and spatial resolutions and different color components. Specifically, the high-speed image acquisition section 101a acquires R and B high-speed low-resolution moving images of a subject, and the low-speed image acquisition section 101b acquires a G low-speed high-resolution moving image of the same subject.

FIG. 4A(a) and FIG. 4A(b) show the relationship between a high-speed low-resolution moving image acquired by the high-speed image acquisition section 101a and a low-speed high-resolution moving image acquired by the low-speed image acquisition section 101b. FIG. 4A(a) and FIG. 4A(b) show continuous frame images of the above-mentioned two types of moving images along time. Frames 201 and 202 represent the low-speed high-resolution moving image, and frames 211 through 215 represent the low-speed high-resolution moving image.

In FIG. 4A(a) and FIG. 4A(b), the difference in the spatial resolution is represented by the size of the images. The frames 211 through 215 have a smaller number of pixels, a lower spatial resolution, and a larger pixel size than the frames 201 and 202. Regarding the frame rate, the high-speed image acquisition section 101a shoots images at a higher frame rate than the low-speed image acquisition section 101b.

In this example, the width of the frames 201 and frame 202 in the time direction represents the exposure time. In the time duration in which the low-speed image acquisition section 101b shoots one frame 201, the high-speed image acquisition section 101a shoots four frames. The image acquired by the low-speed image acquisition section 101b is of a lower frame rate than, but can be exposed for a longer time than, the image acquired by the high-speed image acquisition section 101a. In FIG. 4A(a), the frame 201 of the low-speed high-resolution moving image is exposed for the time corresponding to four frames of the high-speed low-resolution moving image in FIG. 4A(b).

Regarding the shooting timing of the frames acquired by the high-speed image acquisition section 101a and the frames acquired by the low-speed image acquisition section 101b, it is merely necessary that the relationship of the time is known. It is not necessary that the images are shot at the same time. Namely, the time phase at the shooting timing may be different.

Specifically, the exposing timing of the low-speed high-resolution moving image and the exposing timing of the high-speed low-resolution moving image may be set as shown in FIG. 4B. In FIG. 4B, the horizontal axis represents the time. The rectangles each represent a frame of each pixel, and the width of each rectangle represents the length of the exposure time. In FIG. 4B, the exposing timing of the low-speed high-resolution moving image is not synchronized with the exposing timing of the high-speed low-resolution moving image having the input pixels as shown in FIG. 4A(b). As the exposing timing of each image, any timing is usable.

Since the exposing timings are not in synchronization, the timings at which the high-speed image acquisition section 101a and the low-speed image acquisition section 101b of the image acquisition section 101 shown in FIG. 2 acquire the signals of the respective input images may be shifted from each other similarly.

Figure 4C:
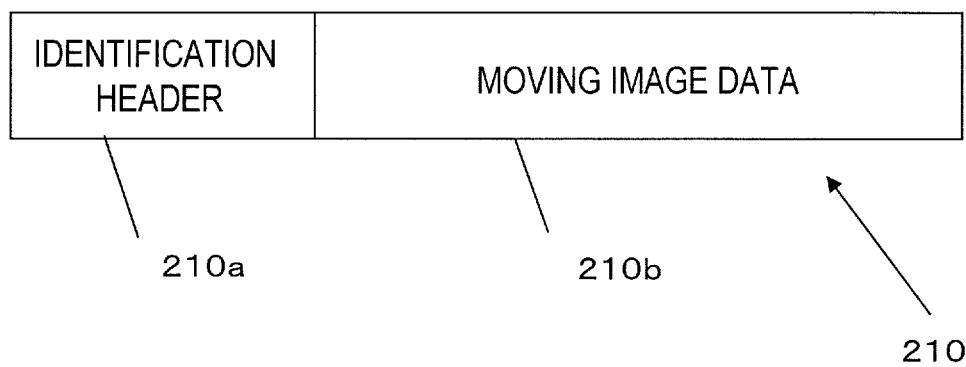
FIG. 4C shows an example of format of a video signal 210 including an identification header 210a in which information on shooting conditions is described and moving image data 210b.

When the two types of moving images are shot at the exposing timings shown in FIG. 4B, a mechanism by which the imaging device 10 notifies the image generation device 30 of the exposing timings is needed. It is conceived to add shooting conditions to the video image to be transmitted. FIG. 4C shows an example of format of a video signal 210 including an identification header 210a in which information on the shooting conditions is described and moving image data 210b.

The imaging device 10 stores the information indicating the shooting conditions in the identification header 210a, and outputs the video signal 210 including the identification header 210a added to the moving image data 210b obtained by the shooting.

The image acquisition section 101 in the image generation device 30 receives the video signal 210 and first reads the identification header 210a to acquire the information on the shooting conditions. Based on the shooting conditions, the image acquisition section 101 acquires the moving image data 210b. The image processing section 103 sets conditions described later based on the shooting conditions described in the identification header 210a.

The information on the shooting conditions of the image stored in the identification header 210a includes exposure time or frame rate of each pixel position, relative time difference (time phase contrast) of exposing timings of pixels, or numerical values or codes associated thereto.

When the image acquisition section 101 receives a digital signal, the identification header 210a is digital data. Accordingly, a value representing the shooting condition such as the exposure time, frame rate, relative time difference of exposing timings or the like may be directly represented by a digital value. Alternatively, a value of the voltage, charge amount or current (analog value) in a corresponding imager may be rounded to a prescribed effective number of digits and such a value may be represented by a digital value.

By contrast, when the image acquisition section 101 receives an analog video signal, the above-mentioned information is represented by an analog value of the voltage, charge amount, current or the like in the imager, or represented by a numerical value or code associated thereto.

As described later, long-time exposure allows motion information to be acquired even in a high-resolution image, like a movement track of a moving object. A moving image which is not contradictory to the motion information obtained from a high-resolution image is generated by the image processing described later, and thus the resultant moving image has high temporal and spatial resolutions and a high S/N ratio, and has motion blur suppressed.

Figure 5A:
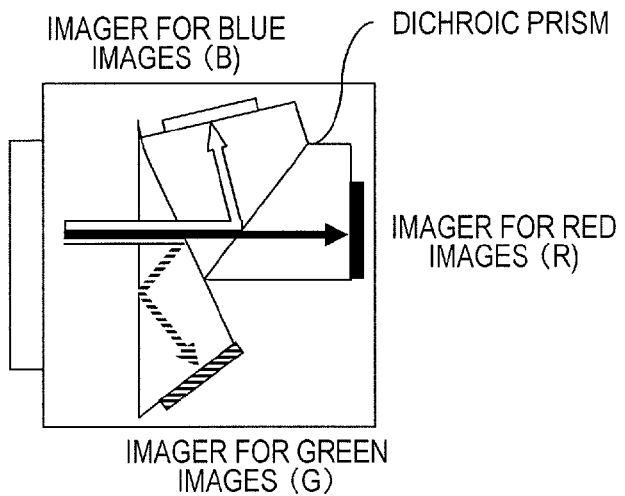
FIGS. 5A through 5C show examples of structure of an imaging device.
Figure 5B:
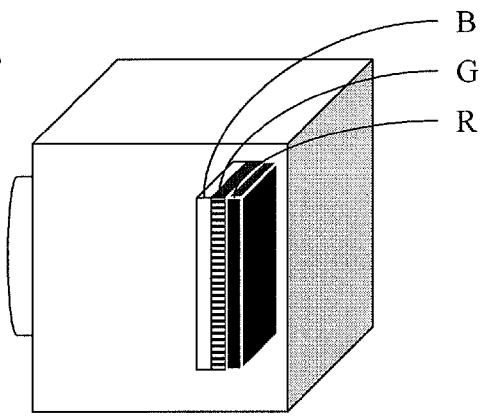
Figure 5C:
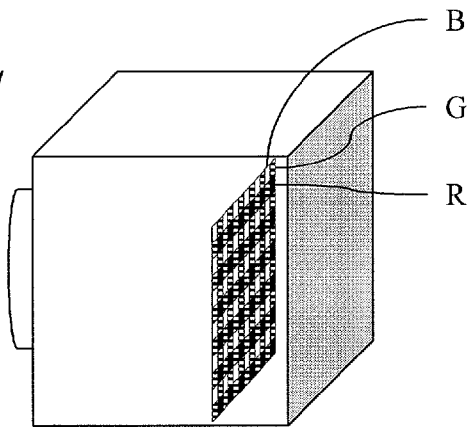

Now, a specific example of the imaging device 10 capable of acquiring moving images having different temporal and spatial resolutions and different colors as described above will be described. FIG. 5A shows an example of structure of an imaging device of a multi-element method using a dichroic prism or a dichroic mirror. FIG. 5B shows an example of structure of an imaging device of a multi-layer single-element method. FIG. 5C shows an example of structure of an imaging device of a single-layer single-element method. In each structure, an imager B for a blue image, an imager G for a green image, and an imager R for a red image are shown. The imager R (red) and the imager B (blue) shoot red and blue high-speed low-resolution moving images, and the imager G (green) shoots a green low-speed high-resolution moving image with a long exposure time. Namely, each imager shoots one same subject with a different spatial resolution, a different frame rate, and a different exposure time for the respective color.

Figure 6A:
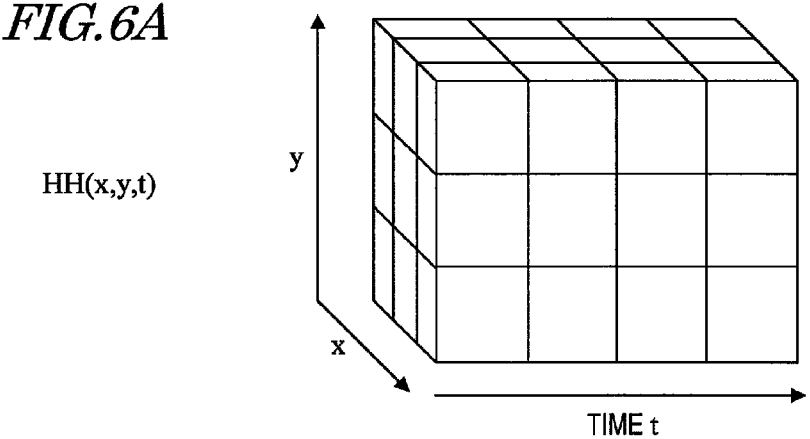
FIGS. 6A through 6C show the relationship among the pixel value of a high-speed high-resolution moving image, the pixel value of the high-speed low-resolution moving image acquired by the high-speed image acquisition section 101a and the pixel value of the low-speed high-resolution moving image acquired by the low-speed image acquisition section 101b.
Figure 6B:
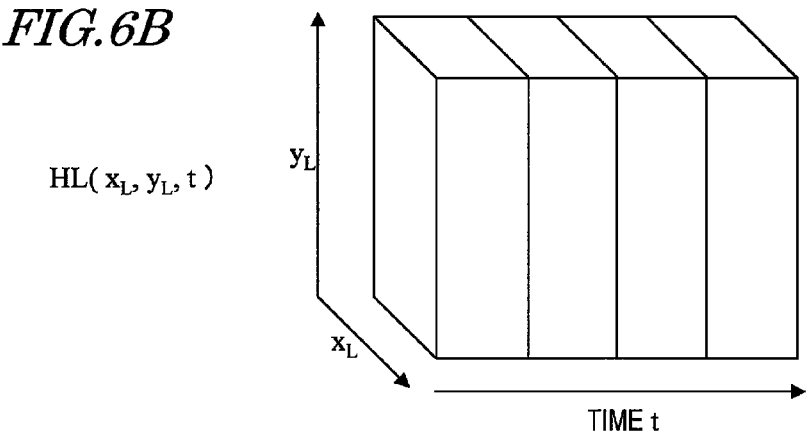
Figure 6C:
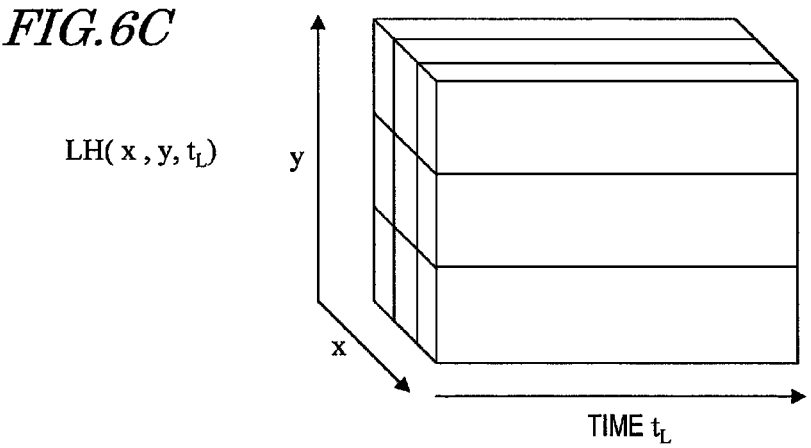

Now, with reference to FIGS. 6A through 6C, the relationship among the pixel value of the target high-speed high-resolution moving image, the pixel value of the high-speed low-resolution moving image acquired by the high-speed image acquisition section 101a, and the pixel value of the low-speed high-resolution moving image acquired by the low-speed image acquisition section 101b. The "pixel value" is a numerical value defined for each of R, G and B. Now, the relationship among the pixel values of one same color will be described. This relationship corresponds to the first condition set by the first condition setting section 103c. The color image generation section 103d generates a high-speed high-resolution moving image such that each of pixels thereof fulfills this condition.

In the following description, the pixel value of each image is in proportion to the incident light amount at the time of imaging, and has a common proportionality constant. FIG. 6A shows a pixel arrangement of each frame of a target high-speed high-resolution moving image. For the sake of convenience, the explanation will be made on a part of the high-speed high-resolution moving image. FIG. 6A shows the arrangement of three pixels in the length direction (Y axis)×three pixels in the width direction (X axis)×4 frames. Namely, the spatial resolution is 3×3 pixels and the temporal resolution is 4 frames. The pixel value at the pixel position (x, y, t) is represented as HH (x, y, t). x and y each have a value of 0, 1 or 2. t has a value of 0, 1, 2 or 3. Similarly, FIG. 6B shows a pixel arrangement of a high-speed low-resolution moving image of the same subject as that of FIG. 6A which is shot from the same viewpoint, in the same view field at the same time.

The pixel value at the pixel position (xL, yL, t) of the high-speed low-resolution moving image is represented as HL (xL, yL, t). Since a low-resolution image and a high-resolution image have different number of pixels in the x and y directions, the x and y coordinate values of the low-resolution image are represented as xL and yL respectively to be distinguished from the coordinate values of the high-resolution image. In this example, an area of nine pixels, namely, 3×3 pixels in the x and Y directions, of the high-resolution image corresponds to one pixel of the low-resolution image. The relationship between the pixel values is represented by expression 1. The pixel value of the low-resolution image is the sum of the pixel values of nine pixels of the high-resolution image. The light amount received by each pixel is increased. In this embodiment, expression 1 is applied to the pixel values of R and B. In expression 1, 3×3 pixels are added, but the range of addition is not limited to this. The number of pixels may be different between the x direction and the y direction. The range of addition may be different between R and B.

$$HL(x_L, y_L, t) = \sum_{x=0}^{2} \sum_{y=0}^{2} HH(x, y, t) \quad \text{[Expression 1]}$$

Similarly, FIG. 6C shows a pixel arrangement of a low-speed high-resolution moving image of the same subject as that of FIG. 6A which is shot from the same viewpoint, in the same view field at the same time. The pixel value at the pixel position (x, y, tL) of the low-speed high-resolution moving image is represented as LH (x, y, tL). Since a high-speed image and a low-speed image have different numbers of frames in the time direction, the frame number of the low-speed image is represented as tL to be distinguished from the frame number of the high-speed image. In this example, the time duration of four frames of the high-speed image corresponds to the time duration of one frame of the low-speed image. The relationship between the pixel values is represented by expression 2. The pixel value of the low-speed image is the sum of the pixel values of three frames of the high-speed image. The light amount received by each pixel is increased. In this embodiment, expression 2 is applied to the pixel value of G. In expression 2, 4 frames are added, but the range of addition is not limited to this.

$$LH(x, y, t_L) = \sum_{t=0}^{3} G(t) * HH(x, y, t) \quad \text{[Expression 2]}$$

Figure 7A:
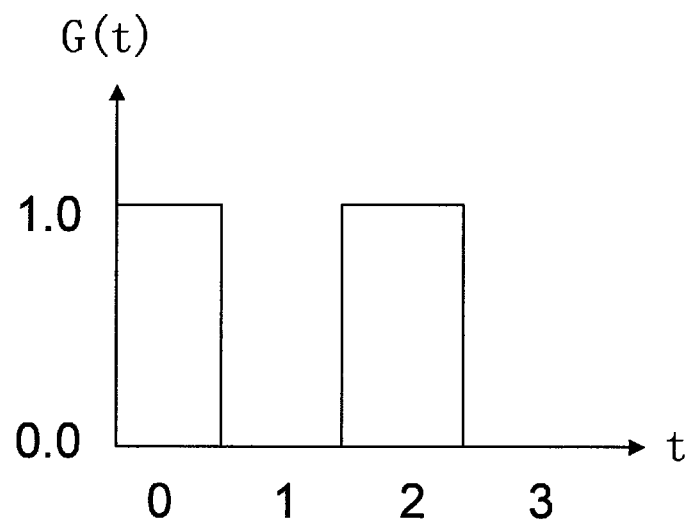
FIGS. 7A and 7B show an over-time change of the shooting strength.
Figure 7B:
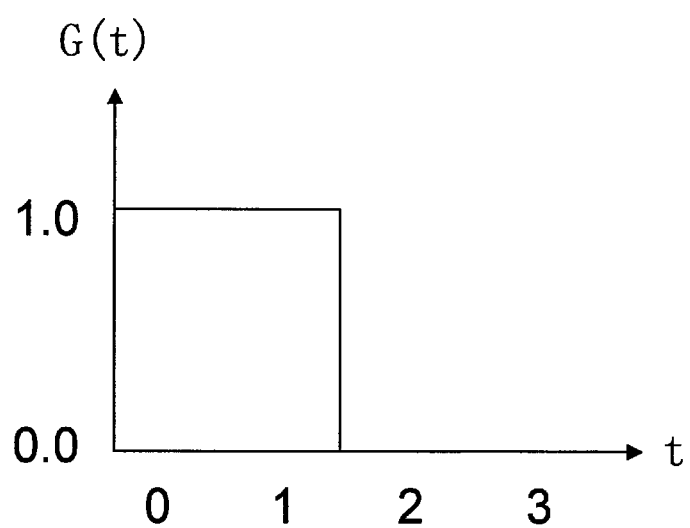

In the expression, G(t) represents the shooting intensity at time t, which shows the magnification at which the pixel value changes in accordance with the over-time change of the sensitivity of the imager or the over-time change of the aperture stop at the time of shooting. When there is no over-time change in the sensitivity of the imager or the aperture stop at the time of shooting, G(t)=1.0. When there is such a change, the over-time change may be included as shown in FIGS. 7A and 7B. When the over-time change occurs as shown in FIGS. 7A and 7B, the exposure value is decreased but a temporal high frequency component can be obtained.

In the above-described example, time t is represented discretely. In order to associate time t to a continuous over-time change, expression 3 can be used. In expression 3, HH (x, y, t) in expressions 1 and 2 is replaced with HHcont (x, y, tcont). Owing to this, a deterioration process (image conversion from the target moving image to the acquired images) to over-time continuous inputs can be represented.

$$HH(x, y, t) = \int_{t}^{t+\Delta t} \text{Exp}(t_{cont}) \cdot HH_{cont}(x, y, t_{cont}) dt_{cont} \quad \text{[Expression 3]}$$

In expression 3, (t corresponds to the virtual exposure time of a frame image of the high-speed high-resolution image to be generated. tcont represents the continuous time, HHcont (x, y, tcont) represents the over-time continuous image, and Exp (tcont) represents the over-time change of the virtual exposure of the frame image of the high-speed high-resolution image.

As shown in FIGS. 6A, 6B and 6C, when the exposure time of the low-speed image is extended as compared to the exposure time of the high-speed image, the light amount to be received can be increased, the noise is relatively suppressed, and so an image having a high S/N ratio can be shot. As a result, a high-speed high-resolution moving image having motion blur suppressed can be generated. The light amount to be received can be increased even in the case of a low-resolution image having a large pixel size, and so a high-speed high-resolution moving image having a high S/N ratio and having motion blur suppressed can be generated.

Figure 8A:
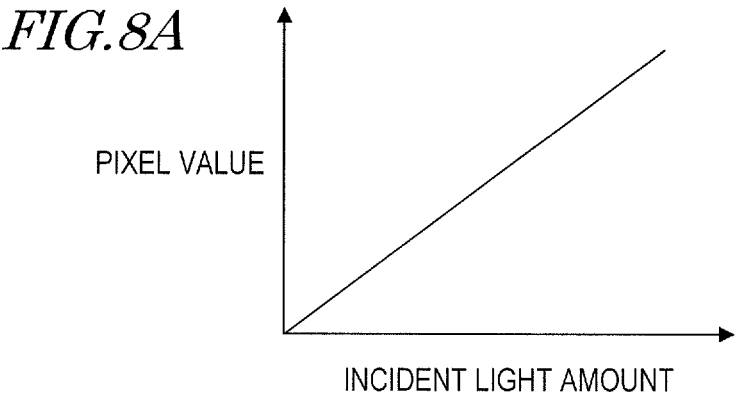
FIGS. 8A through 8C show the relationships between the pixel value and the incident light amount at the time of imaging.
Figure 8B:
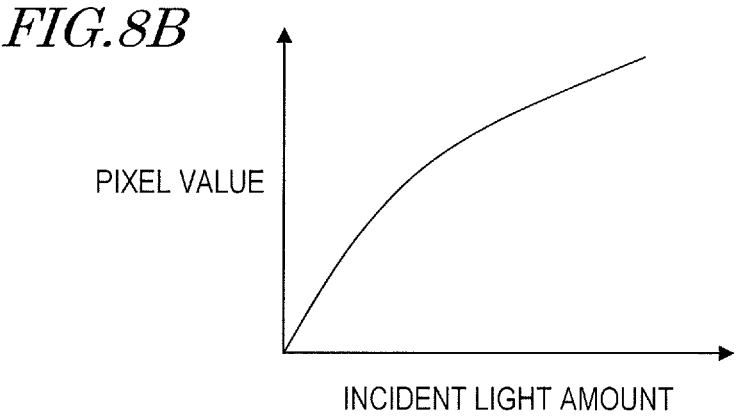
Figure 8C:
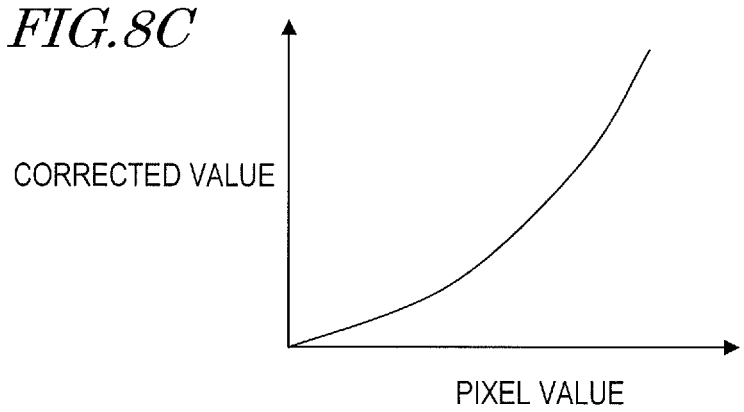

In the above, an example in which the pixel value is in proportion to the incident light amount at the time of imaging as shown in FIG. 8A has been described. In the case where such a proportional relationship is not obtained due to γ correction or the like (FIG. 8B), or in the case where the proportionality constant is different pixel by pixel, the input/output characteristics (input/output relationship) of the imager when the image was shot may be associated and used. Owing to this, the pixel value can be corrected to a value having the proportional relationship to the incident light as described above, and thus the relationship of expression 1 or 2 can be fulfilled. For example, by use of the correlation between the pixel value and the corrected value as shown in FIG. 8C, the pixel value as shown in FIG. 8B can be corrected and processed in the same manner as the pixel value as shown in FIG. 8A.

Now, FIG. 3 will be referred to again. In step 302, the motion detection section 102 detects a motion of each pixel in each of images included in the high-speed low-resolution moving image, and calculates the reliability of the motion detection. In this embodiment, the motion detection processing is executed as follows. Regarding each position of each frame image of the moving image obtained from the high-speed image acquisition section 101a, the motion detection section 102 finds the direction and the size of the motion of the subject, and also finds the temporal and spatial distributions conf (x, y, t) of the reliability of the motion detection found. Regarding "reliability of the motion detection", as the reliability is higher, the result of the motion detection is more likely; whereas when the reliability is low, the result of the motion detection is erroneous.

In this embodiment, the R and B high-speed low-resolution images are acquired, and an image as the sum of the R and B images is used for the motion detection. The motion detection can be made based on either one of the R and B images, but the sum of the R and B images is used in order to utilize the information of both of the images.

The motion at each position of the image between two adjacent frame images is found by, for example, the method used in P. Anandan, "A Computational Framework and an Algorithm for the Measurement of Visual Motion", IJCV, 2, 283-310 (1989), a motion detection technique generally used for coding moving images, a feature point trace technique used for tracing a moving object using images, or the like.

Alternatively, a motion of a plurality of areas may be detected by a general technique used for detecting a global motion (affine motion) of an entire image, the technique described in Lihi Zelkik-Manor, "Multi-body Segmentation: Revisiting Motion Consistency", ECCV (2002), or the like, and the detected motion can be used as a motion at each pixel position.

Figure 9A:
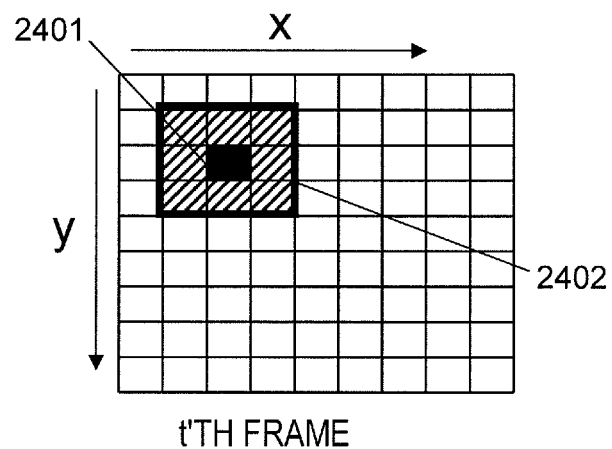
FIGS. 9A and 9B respectively show pixel arrangements at frame Nos. t and t+1 regarding motion detection processing.
Figure 9B:
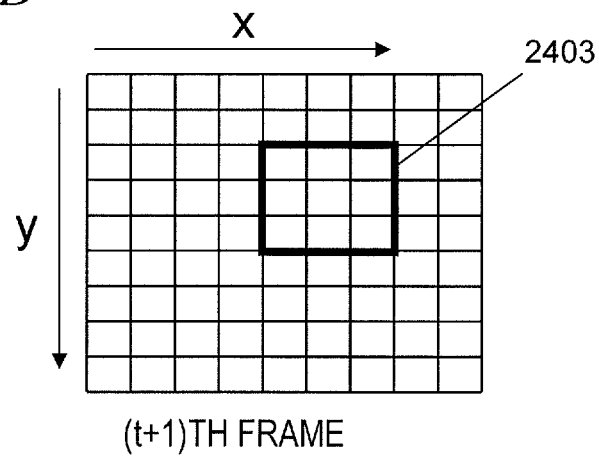

A method for motion detection between two frame images using block matching will be described. FIGS. 9A and 9B each show a pixel arrangement of frame Nos. t and t+1, which is related to motion detection processing. Now, a black pixel 2401 in FIG. 9A is set as the pixel of interest, and the pixel in the next frame image to which this pixel of interest corresponds (moved to) is determined by the following procedure.

First, a block area 2402 (hatched area of 3×3 pixels) having the pixel of interest 2401 at the center is set. The block size thereof is determined in advance. Next, in the next frame image (FIG. 9B), an area 2403 having the same size as that of the block area (3×3 pixels) is set. An SSD (Sum of Squared Difference) or an SAD (Sum of Absolute Difference) of the pixels of the area 2402 and the area 2403 is found. Then, the position of the area 2403 is changed sequentially by one pixel in the image of FIG. 9B. The position of the central pixel of the area 2403 when the SSD or SAD is the minimum is set as the pixel position corresponding to the pixel 2401 (tip of the motion vector).

This is the result of the motion detection on the pixel 2401. Substantially the same procedure is repeated for all the pixels in FIG. 9A with the pixel of interest being changed. Thus, the motion detection on the frame image of FIG. 9A is competed. The motion detection is performed on two adjacent frame images sequentially among continuous frame images, and thus the motion detection on the entire moving image is completed.

The reliability may be found by use of the method described in the literature of Anandan mentioned above. When the motion detection is performed using block matching, as represented by expression 4, a value obtained by subtracting the squared sum of the pixel value differences between blocks corresponding to the motion from the maximum possible value SSDmax that the squared sum of the differences can take, namely, a value obtained by inverting the sign of the squared sum of the pixel value differences between of the blocks, i.e., conf (x, y, t) may be used as the reliability. Also when the global motion detection of the image or the area-by-area motion detection is used, a value obtained by subtracting the squared sum of the pixel value differences between an area near the motion start point and an area near the motion end point of each pixel position, from the maximum possible value SSDmax that the squared sum can take, i.e., conf (x, y, t) may be used as the reliability.

[Expression 4]
$$Conf(x, y, t) = SSD_{max} - \sum_{i \subset block} \sum_{j \subset block} \{I(x+i, y+j, t) - I(x'+i, y'+j, t+1)\}^2$$

In Expression 4, the position (x', y', t+1) is the pixel position corresponding to the position to which the pixel position (x, y, t), obtained as the result of the motion detection, is to move. I (x, y, t) is the pixel value of (x, y, t). In expression 4, $\Sigma$ represents the addition in the block area used for block matching.

Next, in step 303 in FIG. 3, a motion constraining condition $Q_m$, which should be fulfilled by the color moving image to be generated as the target moving image, is set by the third condition setting section 103a. The third condition setting section 103a sets the motion constraining condition $Q_m$ in accordance with expression 5 using the motion distribution and the reliability found by the motion detection section 102. In expression 5 below, $R_H$, $G_H$ and $B_H$ respectively represent the RGB components of the target color image to be generated, and $v_x$ and $v_y$ respectively represent an x direction component and a y direction component of the detected motion.

[Expression 5]
$$Q_m = \sum_x \sum_y \sum_t conf(x, y, t) \cdot$$
$$[\{R_H(x + v_x(x, y, t), y + v_y(x, y, t), t+1) - R_H(x, y, t)\}^2 +$$
$$\{G_H(x + v_x(x, y, t), y + v_y(x, y, t), t+1) - G_H(x, y, t)\}^2 +$$
$$\{B_H(x + v_x(x, y, t), y + v_y(x, y, t), t+1) - B_H(x, y, t)^2\}^2]$$

In expression 5, each (means addition performed on each of x, y and t. As a result, the motion constraining condition Qm is defined for the target moving image. Expression 5 defines the motion constraining condition Qm, the value of which is decreased as the pixel values of the colors of a pixel in the corresponding target moving image are more uniform (i.e., the pixel values are more continuous) along the motion detected on the acquired moving image. In expression 5, the change amount of the pixel value is weighted with the reliability of the motion detection.

When motion detection is performed using a low-resolution image, a motion vector cannot be obtained at all the pixel positions of a high-resolution image. In such a case, the motion vector may be obtained by interpolating motion vectors defined in the vicinity spatially. As the interpolation method, a general method such as a bilinear method, a bicubic method or the like can be used.

When the value of the motion constraining condition Qm should be small, this means that the pixel values of pixels in the target moving image should be continuous along the motion detected on the acquired moving image.

Next, in step 304, the light amount determination section 104 determines whether or not saturation of the pixel value has occurred, and whether or not the pixel has been blocked-up-shadowed, regarding each pixel of each frame of the RGB images acquired by the image acquisition section 101.

For determining whether or not the pixel value has been saturated, saturation values $S_R$, $S_G$ and $S_B$ are determined respectively for the RGB components in advance, and it is determined whether or not the value of each of the RGB components is equal to or greater than the saturation value. For determining whether or not the pixel has been blocked-up-shadowed, values $D_R$, $D_G$ and $D_B$ for the blocked up shadows are determined respectively for the RGB components in advance, and it is determined whether or not the value of each of the RGB components is equal to or less than the value for the blocked up shadows. The saturation value may be, for example, the maximum value of the pixel value or the upper limit of the output of the imager. The value for the blocked up shadows may be, for example, 0 or the lower limit of the output of the imager. These reference values may be different pixel by pixel.

Next, in step 305, the first condition setting section 103c sets a deterioration constraining condition using the relationship between the acquired image and the target moving image represented by expressions 1 through 3. Expressions 6 through 8 represent examples of constraining conditions. In expressions 6 through 8, $R_H$, $G_H$ and $G_H$ respectively represent the RGB components of the target color image to be generated. $H_R$, $H_G$ and $H_B$ respectively represent conversion from the high-speed high-resolution moving image to the acquired image regarding the RGB colors. In this embodiment, $H_R$ and $H_B$ represent conversion to the low-spatial-resolution image corresponding to expression 1. $H_G$ represents conversion to the low-frame-rate image with long-time exposure corresponding to expressions 2 and 3. $R_{LH}$, $G_{HL}$ and $G_{LH}$ respectively represent the acquired R image, G image and B image. The values of expressions 6 through 8 decrease as an image obtained by deterioration conversion from the generated target moving image by means of resolution reduction or frame rate reduction in conformity to the shooting process, and the acquired image match better.

$|H_R R_H - R_{LH}|^2$ [Expression 6]

$|H_G G_H - G_{HL}|^2$ [Expression 7]

$|H_B B_H - B_{LH}|^2$ [Expression 8]

On a pixel determined in step 304 to be saturated or blocked-up-shadowed, the evaluations in expressions 6 through 8 are not performed, or the value of evaluation is lowered. The value of evaluation is lowered, for example, by a predefined ratio or to a predefined value. The ratio of lowering or the predefined value may be set separately for saturation and blocked up shadows. Owing to this, even if saturation or blocked up shadows have arisen in the acquired image, a target moving image can be generated with the influence thereof being suppressed. Regarding a saturated pixel, the constraining conditions may be replaced with the conditions as represented by expressions 9 through 11.

$H_R R_H > R_{LH}$ [Expression 9]

$H_G G_H > G_{HL}$ [Expression 10]

$H_B B_H > B_{LH}$ [Expression 11]

Next, in step 306, the second condition setting section 103b sets a spatial constraining condition on the target moving image to be generated. Expressions 12 and 13 respectively represent examples $Q_{s1}$ and $Q_{s2}$ of the spatial constraining condition.

[Expression 12]

$$Q_{s1} = \sum_x \sum_y \sum_t \big[\lambda_\theta(x, y, t) \cdot \{4 \cdot \theta_H(x, y, t) - \theta_H(x, y-1, t) -$$
$$\theta_H(x, y+1, t) - \theta_H(x-1, y, t) - \theta_H(x+1, y, t)\}^2 + \lambda_\varphi(x, y, t) \cdot 4 \cdot \varphi_H(x, y, t) - \varphi_H(x, y-1, t) -$$
$$\varphi_H(x, y+1, t) - \varphi_H(x-1, y, t) - \varphi_H(x+1, y, t)\}^2 + \lambda_r(x, y, t) \cdot$$
$$\{4 \cdot r_H(x, y, t) - r_H(x, y-1, t) - r_H(x, y+1, t) - r_H(x-1, y, t) - r_H(x+1, y, t)\}^2 \big]$$

In expression 12, $Q_H$ (x, y), $\Psi_H$ (x, y), and $r_H$ (x, y) respectively represent coordinate values, which represent the pixel position (x, y) of the target moving image in a three-dimensional orthogonal color space (so-called RGB color space), using a spherical coordinate system ($\theta$, $\Psi$, r) corresponding to the RGB color space. The three-dimensional orthogonal color space is represented by RGB pixel values. RGB pixel values at the pixel position (x, y) in the target moving image. The $\theta_H$ (x, y) and $\Psi_H$ (x, y) represent two types of arguments, and $r_H$ (x, y) represents the radius vector.

Figure 10:
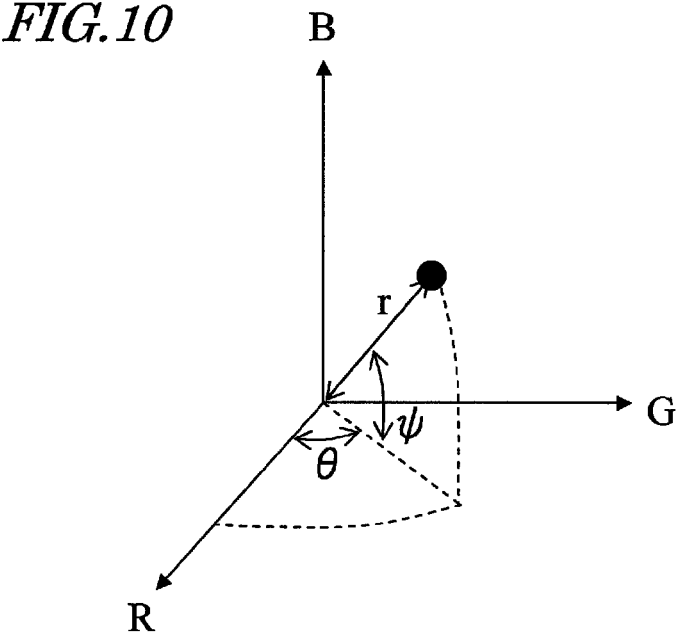
FIG. 10 shows an example of correspondence between the RGB color space and the spherical coordinate system (θ, Ψ, r).

FIG. 10 shows an example of correspondence between the RGB color space and the spherical coordinate system ($\theta$, $\Psi$, r). In FIG. 10, as an example, the direction of $\theta$=0 is the positive direction of the R axis in the RGB color space, and the direction of $\Psi$=0 is the positive direction of the G axis in the RGB color space. The reference directions of the arguments are not limited to those shown in FIG. 10 and may be other directions. In accordance with such a correspondence, regarding each pixel, the pixel value of each of red, green and blue components, which is a coordinate value in the RGB color space, is converted to a coordinate value in the spherical coordinate system ($\theta$, $\Psi$, r).

When the pixel value of each pixel in the target moving image is considered as a three-dimensional vector in the RGB color space, the three-dimensional vector can be represented by the spherical coordinate system ($\theta$, $\Psi$, r) corresponding to the RGB color space. This way, the coordinate value on the r axis, which represents the magnitude of the vector as the brightness of the pixel (signal strength and luminance have the same meaning as the brightness), and the coordinate values on the $\theta$ axis and the $\Psi$ axis, which represent the direction of the vector as the color of the pixel (including hue, color difference, color saturation, etc.), can be independently handled. In a natural image, the temporal and spatial change amounts of the brightness and those of the color are significantly different from each other. Therefore, by choosing a coordinate system which allows these values to be evaluated and adjusted independently, the quality of the target moving image can be improved.

Expression 12 defines the squared sum of two-stage difference values in the x-y space directions of a pixel value, represented by the spherical coordinate system, of the target moving image. Expression 12 defines the condition $Q_{s1}$, the value of which decreases as the changes of the pixel values, represented by the spherical coordinate system, between spatially adjacent pixels in the target moving image are more uniform (i.e., the colors of the pixels are more continuous).

When the value of the condition $Q_{s1}$ should be small, this means that the colors of spatially adjacent pixels in the target moving image should be continuous.

In an image, the change of the brightness of a pixel and the change of the color of the pixel can be caused by physically difference events. Therefore, a desired image quality is more easily obtained by separately setting the condition on the continuity of the brightness of the pixel (uniformity of the change of the coordinate value on the r axis; the condition corresponds to the third term in the largest brackets in expression 12) and the condition on the continuity of the color of the pixel (uniformity of the change of the coordinate values on the θ axis and the Ψ axis; the condition corresponds to the first and second terms in the largest brackets in expression 12).

$\lambda\theta$ (x, y), $\lambda\Psi$ (x, y) and $\lambda_r$ (x, y) are respectively represent weights applied, at the pixel position (x, y) in the target moving image, to the condition which is set by use of the coordinate values on the θ axis, the Ψ axis and the r axis, and are predefined. In a simple manner, these weights may be set without depending on the pixel position or the frame, as represented by $\lambda\theta$ (x, y)=$\lambda\Psi$, (x, y)=1.0, $\lambda_r$ (x, y)=0.01.

Preferably, these weights may be set small at a position where discontinuity of the pixel values in an image is expected. For example, the weight is set small at a position where the spatial differential value of the acquired image is large.

It may be determined that the pixel values are discontinuous based on that the difference value, or the absolute value of the two-stage difference value, of the pixel values of adjacent pixels in a frame image of the acquired image is equal to or greater than a certain value.

It is desirable that the weight applied to the condition on the continuity of the color of a pixel is larger than the weight applied to the condition on the continuity of the brightness of the pixel. A reason for this is that the brightness of the pixel in the image is more easily changed than the color by a change in the orientation of the surface of the subject (direction of the normal) caused by the unevenness of the surface of the subject or the motion of the subject (the brightness of the pixel is poorer in the uniformity of change).

In expression 12, the squared sum of two-stage difference values in the x-y space directions of the pixel value, represented by the spherical coordinate system, of the target moving image is set as the condition $Q_{s1}$. Alternatively, the sum of absolute values of the two-stage difference values, the squared sum of the one-stage difference values, or the sum of the absolute values of the one-stage difference values may be set as the condition.

In the above description, the color space conditions are set by use of the spherical coordinate system (θ, Ψ, r) corresponding to the RGB space. The coordinate system to be used is not limited to the spherical coordinate system. As long as the conditions are set in a new orthogonal coordinate system having coordinate axes by which the brightness and the color of the pixel can be easily separated, substantially the same effect as described above can be provided.

Figure 11:
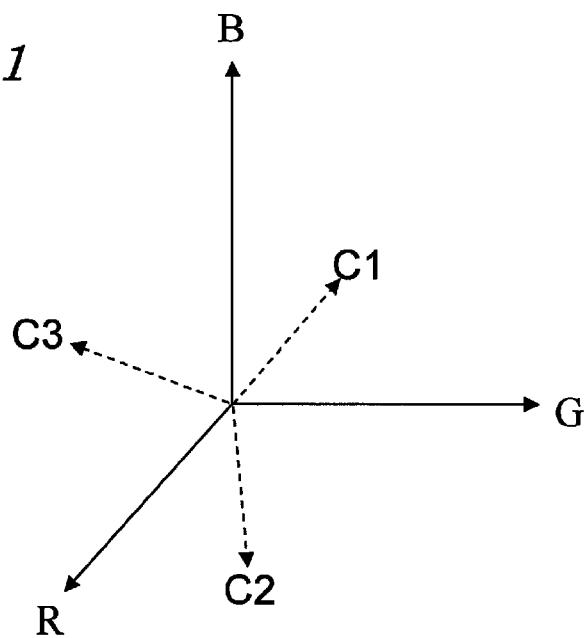
FIG. 11 shows an example of proper vector axes (C1, C2, C3) in the RGB color space.

The coordinate axes of a new orthogonal coordinate system can be set as follows, for example. The frequency distribution, in the RGB space, of a pixel value included in the acquired moving image or another moving image usable as the reference is subjected to main component analysis (analysis based on the dispersion) to find the directions of proper vectors (vectors perpendicular to each other, chosen by the magnitude of dispersion). The coordinate axes can be provided in the directions of the proper vectors found (the proper vector axes are used as the coordinate axes). An example of proper vector axes (C1, C2, C3) in the RGB space is shown in FIG. 11.

[Expression 13]

$$Q_{s2} = \sum_x \sum_y \sum_t [\lambda_{C1}(x, y, t) \cdot$$
$$\{4 \cdot C_1(x, y, t) - C_1(x, y-1, t) - C_1(x, y+1, t) - C_1(x-1, y, t) - C_1(x+1, y, t)\}^2 +$$
$$\lambda_{C2}(x, y, t) \cdot$$
$$\{4 \cdot C_2(x, y, t) - C_2(x, y-1, t) - C_2(x, y+1, t) - C_2(x-1, y, t) - C_2(x+1, y, t)\}^2 +$$
$$\lambda_{C3}(x, y, t) \cdot$$
$$\{4 \cdot C_3(x, y, t) - C_3(x, y-1, t) - C_3(x, y+1, t) - C_3(x-1, y, t) - C_3(x+1, y, t)\}^2]$$

In expression 13, $C_1$ (x, y), $C_2$ (x, y) and $C_3$ (x, y) represent rotary conversion of converting the coordinate values in the RGB space, which are pixel values of the red, green and blue components at the pixel position (x, y) in the target moving image, to the coordinate values on the coordinate axes $C_1$, $C_2$ and $C_3$ of the new orthogonal coordinate system.

Expression 13 defines the squared sum of the two-stage difference values in the x-y space directions of a pixel value, represented by the new orthogonal coordinate system, of the target moving image. Expression 13 defines the condition $Q_{s2}$, the value of which decreases as the changes of the pixel values, represented by the new orthogonal coordinate system, between spatially adjacent pixels in each frame image in the target moving image are more uniform (i.e., the pixel values are more continuous).

When the value of the condition $Q_{s2}$ should be small, this means that the colors of spatially adjacent pixels in the target moving image should be continuous.

$\lambda_{c1}$ (x, y), $\lambda_{c2}$ (x, y) and $\lambda_{c3}$ (x, y) respectively represent weights applied, at the pixel position (x, y) in the target moving image, to the condition which is set by use of the coordinate values on the $C_1$ axis, the $C_2$ axis and the $C_3$ axis, and are predefined.

In the case where the $C_1$ axis, the $C_2$ axis and the $C_3$ axis are proper vector axes, there is an advantage that by separately setting the values of $\lambda_{c1}$ (x, y), $\lambda_{c2}$ (x, y) and $\lambda_{c3}$ (x, y) along the respective proper vector axes, a preferable value of $\lambda$ can be set in accordance with the value of dispersion, which is different among the proper vector axes. Namely, it is expected that in the direction of a non-main component, the dispersion is small and so the squared sum of the two-stage difference values is small. Therefore, the value of $\lambda$ is set large. Oppositely, in the direction of a main component, the value of $\lambda$ is set relatively small.

In the above, examples of two types of conditions $Q_{s1}$ and $Q_{s2}$ have been described. As a condition $Q_{s3}$, either $Q_{s1}$ or $Q_{s2}$ is usable.

When, for example, the condition $Q_{s1}$ represented by expression 12 is used, by introducing the spherical coordinate system ($\theta$, $\Psi$, r), the coordinate values on the $\theta$ axis and the $\Psi$ axis, which represent the color information, and the coordinate value on the r axis which represent the signal strength, can be used separately to set the condition, and for setting the condition, a preferable weight parameter $\lambda$ can be provided to each of the color information and the signal strength. Therefore, there is an advantage that a high quality image can be easily generated.

When, for example, the condition $Q_{s3}$ represented by expression 13 is used, the condition can be set by the coordinate values of a new orthogonal coordinate system obtained by linear (rotary) conversion from the coordinate values of the RGB space. Therefore, there is an advantage that the calculations can be simplified.

Where the proper vector axes are used as the coordinate axes $C_1$, $C_2$ and $C_3$ of the new orthogonal coordinate system, the condition can be set by use of the coordinate values on the proper vector axes which reflect the change of colors that influences a larger number of pixels. Therefore, the resultant target moving image is expected to have a higher quality as compared with the case where the condition is set simply by use of the pixel values of the red, green and blue components.

Next, in step 307, a target moving image which fulfills the constraining conditions set by the third condition setting section 103a, the second condition setting section 103b and the first condition setting section 103c is generated. For this purpose, the evaluation function J formed of the constraining conditions is set. An example of J is represented by expression 14.

$$J = |H_R R_H - R_L|^2 + |H_G G_H - G_L|^2 + |H_B B_H - B_L|^2 + Qs + Qm \quad \text{[Expression 14]}$$

J is defined as a function of an image of each of the R, G and B colors which form a high-resolution color image g to be generated ($R_H$, $G_H$ and $B_H$ represent the image vectors). $H_R$, $G_R$ and $B_R$ represent conversion from the color images $R_H$, $G_H$ and $B_H$ of the target moving image g to the acquired low-resolution images $R_L$, $G_L$ and $B_L$ (represented as the vectors) of the respective colors. $H_R$ and $B_R$ represent conversion to the low-resolution image as represented by expression 1, and $H_G$ represents conversion to the low-frame-rate image as represented by expression 2. The evaluation function J is not limited to the above, and terms in expression 14 may be replaced with terms formed of similar expressions, or a new term which represents a different condition may be added.

Next, the color image generation section 103d finds each of the pixel values of the target moving image which decreases the value of J in expression 14 to a maximum possible degree (desirably, minimizes the value of J) to generate color images $R_H$, $G_H$ and $B_H$ of the target moving image. The target moving image g which minimizes the evaluation function J may be found by solving the equation of expression 15, in which all the expressions obtained by differentiating J by the pixel value components of the color images $R_H$, $G_H$ and $B_H$ of the target moving image are set to 0, or may be found by an iterative operation type optimization technique such as the steepest gradient method or the like.

$$\frac{\partial J}{\partial R_H(x, y, t)} = \frac{\partial J}{\partial G_H(x, y, t)} = \frac{\partial J}{\partial B_H(x, y, t)} = 0 \quad \text{[Expression 15]}$$

Finally, in step 308, the generated target moving image is output.

Figure 13:
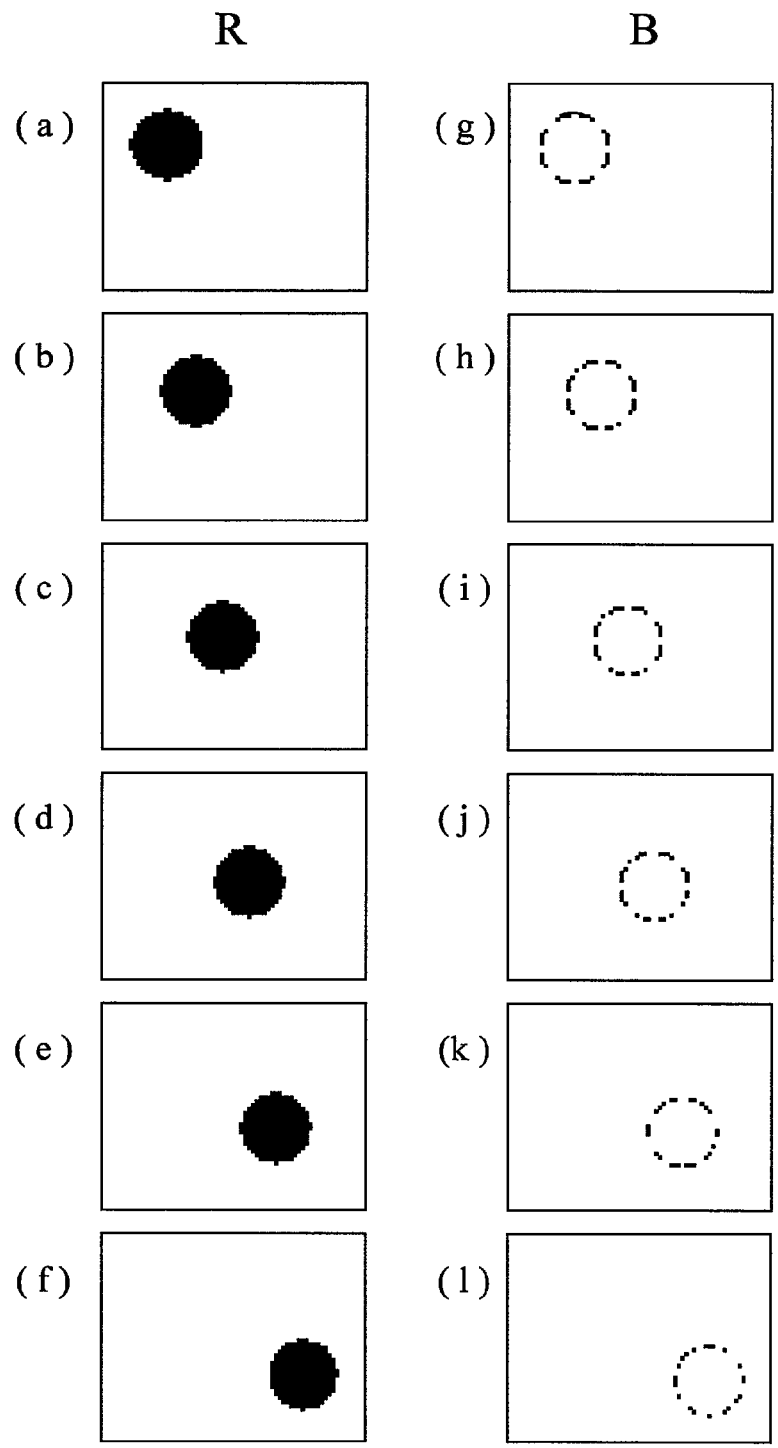
FIGS. 13(a) through (f) show continuous frame images of R of a high-speed low-resolution image.
FIGS. 13(g) through (l) show continuous frame images of B of the high-speed low-resolution image.

An example of input/output image based on the above-described structure will be shown next. FIGS. 12 and FIG. 13 show examples of images of one same subject shot with different colors when no saturation occurs. FIGS. 12(a) and (b) show continuous frame images of a low-speed high-resolution G image shot with long-time exposure. A circular subject 91 is moved to the lower right corner, and motion blur occurs due to long-time exposure. FIGS. 13(a) through (f) show continuous frame images of R of a high-speed low-resolution image, and FIGS. 13(g) through (l) show continuous frame images of B of the high-speed low-resolution image. The images in FIG. 13 have a larger number of frames but a lower resolution than the images in FIG. 12.

Figure 14:
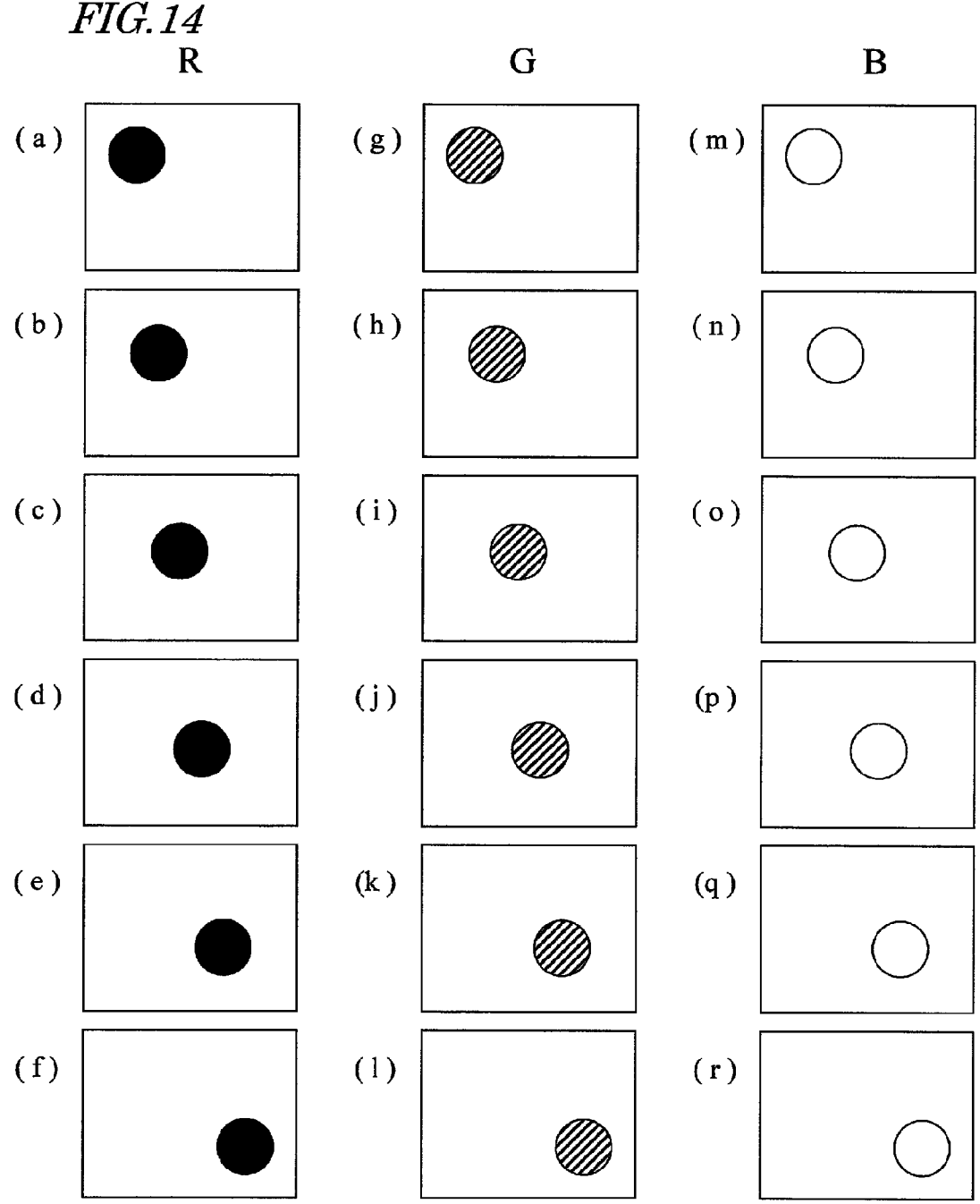
FIGS. 14(a) through (r) show high-speed high-resolution RGB images.

In step 304, the light amount determination section 104 determines whether or not saturation has occurred; and in step 305, the first condition setting section 103c sets the first condition on all the frames and pixels based on the determination result. When an image is generated in step 307, the temporal and spatial information on the images is mutually interpolated among the RGB images. As a result, as shown in FIGS. 14(a) through (r), high-speed high-resolution RGB images are obtained. The temporal timing of each frame is the same as that in FIG. 13.

With reference to FIG. 15, an example in which saturation has occurred in the G image will be described. FIG. 15 shows an example in which saturation has occurred in the G image at the same positions of the subject as those in FIG. 12. FIG. 15 shows a saturated pixel area 121.

Figure 16:
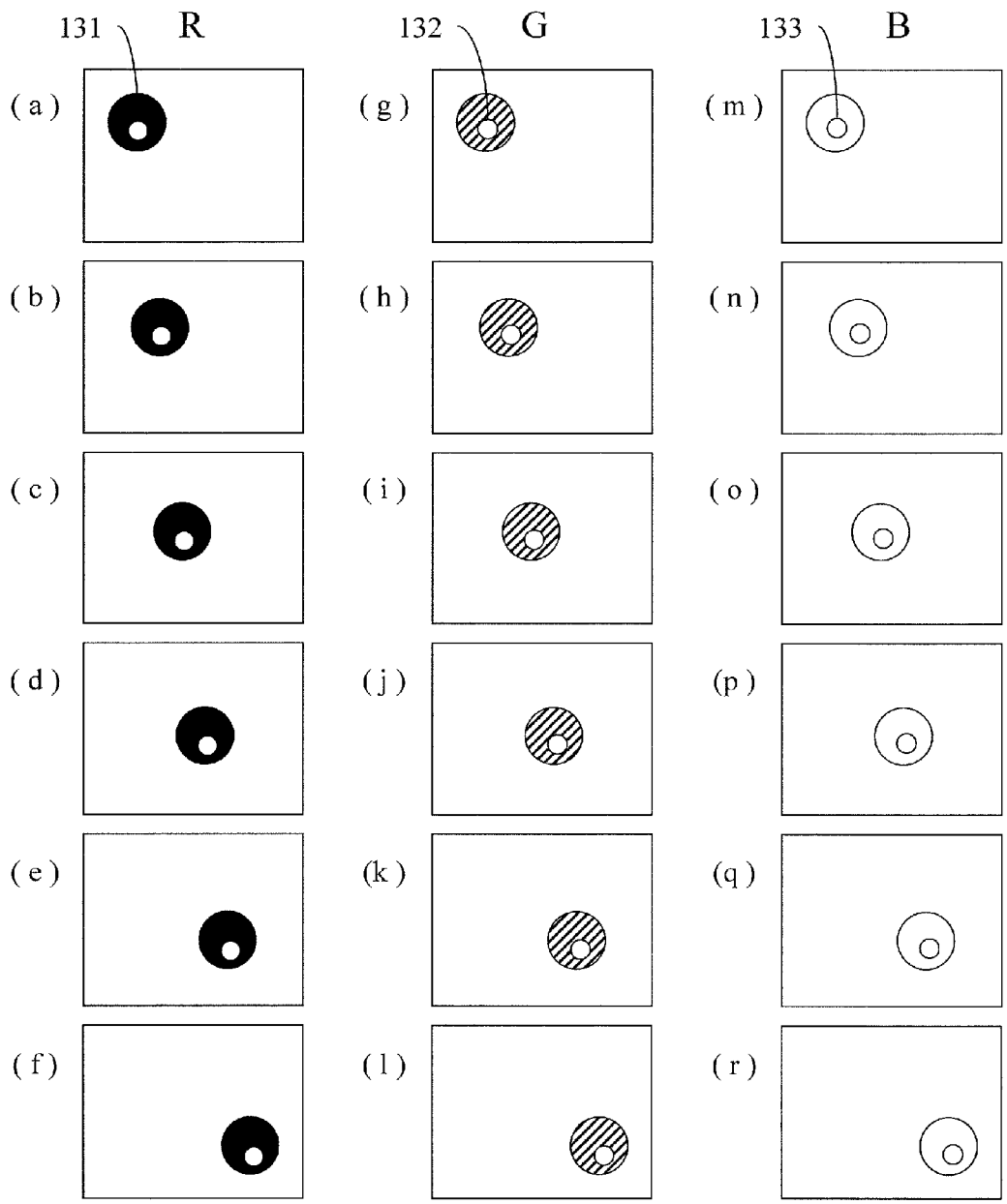
FIGS. 16(a) through (r) show an example of images generated by combining the images in FIG. 15 and FIG. 13 with no determination on the saturation.

FIG. 16 shows an example in which an image is generated by combining the images of FIG. 15 and FIG. 13 with no determination on the saturation of the pixels. In FIG. 16, errors are caused to the pixel values of the RGB images (white circles 131 through 133) in the frames and pixel positions corresponding to the saturated area of G. In the saturated area of the G image, the pixel value is of a darker image than the image of the correct pixel value (larger than the saturation value) if the first condition is fulfilled. When the saturated area of the G image is darker, the color of the saturated area is discontinuous from the colors of the surrounding area, and it becomes difficult to fulfill the constraint on the continuity of the pixel values (second condition). This occurs for the following reason. Images of different colors (RB images and B image) generally change in a similar manner spatially, but when only the G image is saturated, the pixel value of G cannot change spatially in a similar manner to the RB images. When an image is generated with such contradiction, an error is caused to the RGB values and a false color or the like is generated (white circles 131 through 133 in FIG. 16) in the saturated area. In this example, G is saturated, but a false color is generated similarly when saturation occurs in another color of R, B or the like. Also in the case where a color filter of a color other than RGB is used, a false color is generated similarly by saturation.

Next, determination on the saturated area is performed as described in this embodiment (step 304), and the constraint by the first condition is suppressed in the saturated area (step 305). Owing to this, even in the case of the acquired image as shown in FIG. 15, an image in which the influence of saturation (e.g., generation of a false color due to the error in the RGB values) is suppressed can be generated as show in FIG. 14. This is made possible for the following reason. In the saturated area, the constraint by the first condition, which is contradictory to the constraint on the continuity of the pixel values, is suppressed, and so the image is generated with constraining conditions which are other than the first constraining condition and are not contradictory to each other. Therefore, the generation of a false color can be suppressed.

Now, with reference to FIG. 17 and FIGS. 18A and 18B, results of the processing performed in this embodiment will be described.

Figure 17:
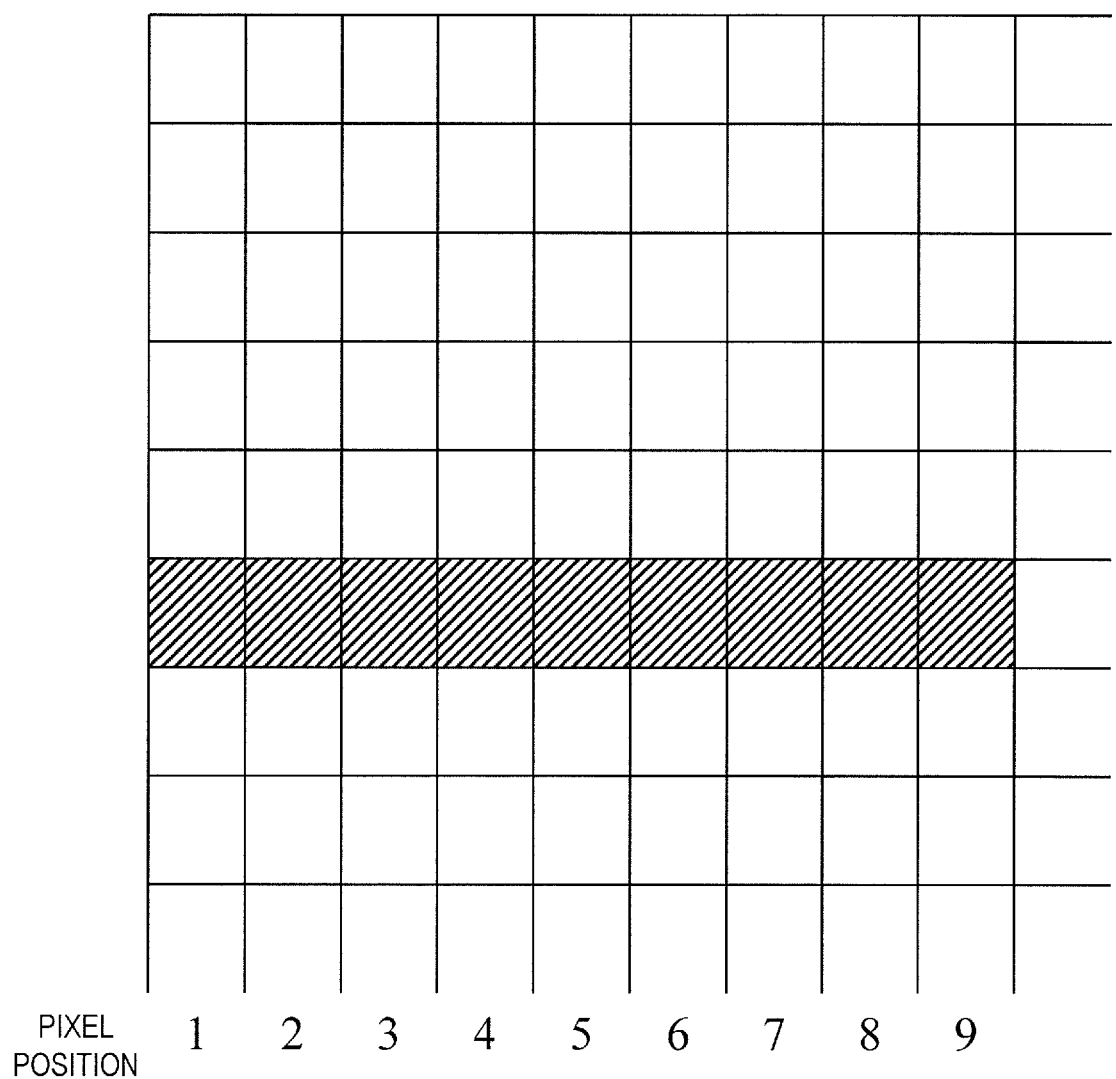
FIG. 17 shows an example of pixel group of R and G images.

FIG. 17 shows an example of pixel group in the R and G images. Hereinafter, the pixel values of the hatched pixel group in the row direction will be described as an example. Pixel positions in the row direction are represented by 1 through 9.

Figure 18A:
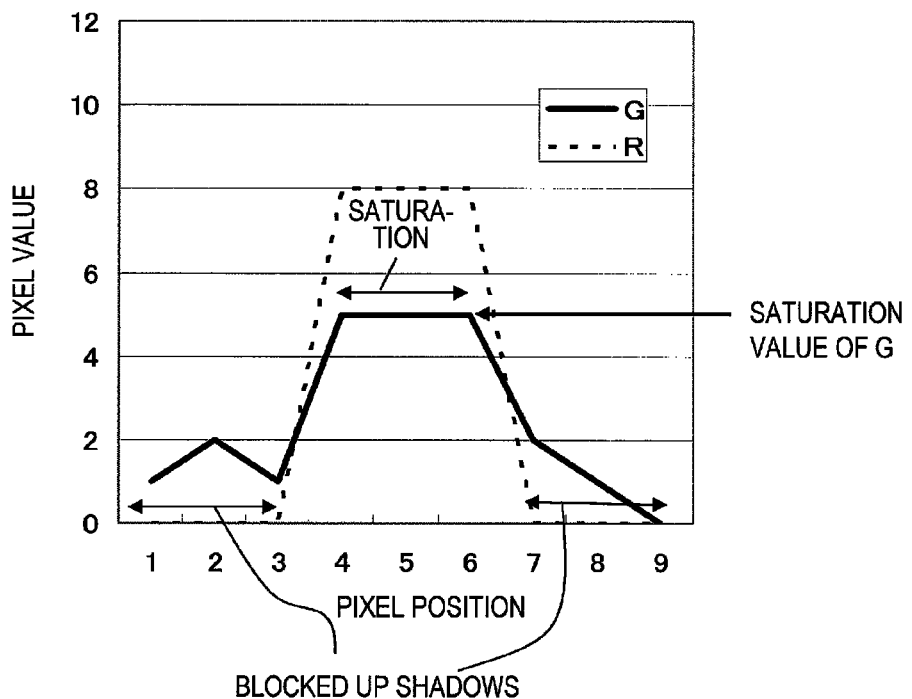
FIGS. 18A and 18B show the relationship between the pixel position and the pixel value regarding R and G images.
Figure 18B:
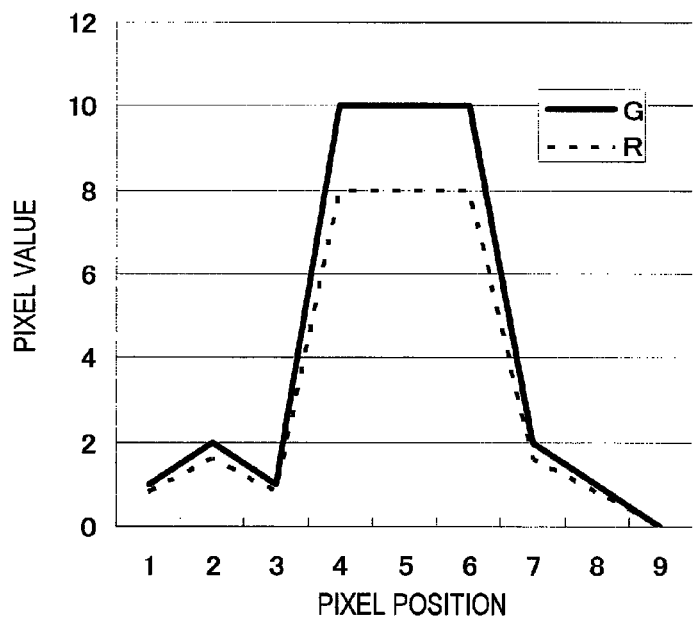

FIGS. 18A and 18B each show the relationship between the pixel position and the pixel value of the R and G images. FIG. 18A shows an example in which the pixel values are blocked-up-shadowed or saturated, and FIG. 18B is a graph schematically showing the effect of the above-described processing in this embodiment. Hereinafter, the R and G images will be used for the explanation, but for any other combination of colors, substantially the same effect is provided by the same procedure.

In FIG. 18A, the G pixel at pixel positions 4 through 6 are saturated at the pixel value indicated by the arrow. When the above-described image processing is performed on such an acquired image, an image as shown in FIG. 18B can be obtained. In FIG. 18B, the pixel value of the saturated area of G at pixel positions 4 through 6 is significantly away from the pixel value of the acquire image and is released from the constraint by the first condition. However, an image is generated in accordance with the constraint on the continuity of the pixel values (second condition or constraint on motion) such that the pixel value (solid line) of G is changed together with the pixel value of R (dashed line). The resultant color image has the false colors suppressed.

In FIG. 18A, at pixel positions 1 through 3 and 7 through 9, the pixel value of R is 0, which means the pixel is blocked-up-shadowed. In step 304, the light amount determination section 104 performs determination on blocked up shadows. In the area determined to be blocked-up-shadowed, an image is generated while the constraint by the first condition on the R image is suppressed. Thus, as shown in FIG. 18B, at pixel positions 1 through 3 and 7 through 9, the image is generated such that the pixel value of R (dashed line) is changed together with the pixel value of G (solid line) in conformity to the constraint on the continuity of the pixel value. Owing to this, a color image with blocked up shadows avoided can be obtained even for the blocked-up-shadowed area. Since the blocked-up-shadowed area is dark, the generation of a false color is not as conspicuous as in the case of saturation. Nonetheless, the present invention provides an effect that a color with no blocked up shadows can be reproduced.

Because of the characteristics of the imaging device, the pixel values at which saturation or blocked up shadows arise may be different color by color. For example, in FIG. 18A, the pixel value of green (G) at pixel positions 4 through 6 is described as being saturated, but a larger pixel value of red (R) at pixel positions 4 through 6 may not be saturated yet.

In the above-described example, only the constraint by the first condition is changed so as to deal with the generation of saturation or blocked up shadows. Another constraint set by the second condition setting section 103b may be changed at the same time. In this case, the second condition or the constraint on motion is strengthened for the frames and pixels for which the constraint by the first condition has been suppressed.

The expression "strengthen the second condition" means decreasing the two-stage differential value of a pixel at which saturation or blocked up shadows have arisen. The expression "strengthen the constraint on motion" means excessively evaluating the value of the motion constraining condition (expression 5) in the evaluation expression regarding a pixel at which saturation or blocked up shadows have arisen. Specifically, the conf (x, y, t) value of the pixel at which saturation or blocked up shadows have arisen is made larger than a preset value. For example, a value obtained by multiplying the preset value by a predetermined constant is used.

This provides an effect that the constraining condition used for generating an image is compensated for in an image area where the constraint by the first condition is suppressed, and thus generation of an image in which occurrence of a false color can be promoted based on another constraint condition. Regarding how to strengthen the constraint, an appropriate manner found in advance, in accordance with the degree at which the constraint by the first condition is suppressed, is used.

Alternatively, the reliability of the motion detection may be lowered at a pixel position for which the light amount determination section 104 determined in step 304 that saturation or blocked up shadows arose.

A reason for this is that saturation or blocked up shadows cause an error to be generated more easily for the motion detection using block matching or the like. By reflecting the error in the motion detection, caused by saturation or blocked up shadows, on the reliability of the motion detection, quality reduction caused by an erroneous constraint on motion can be avoided. How to lower the reliability of the motion detection is determined in advance. For example, the reliability is made 0.

Alternatively, a color image for which saturation or blocked up shadows were determined to have occurred in step 304 may be removed from the color images used for the motion detection. Owing to this also, the error in the motion detection caused by saturation or blocked up shadows can be reduced.

Figure 19A:
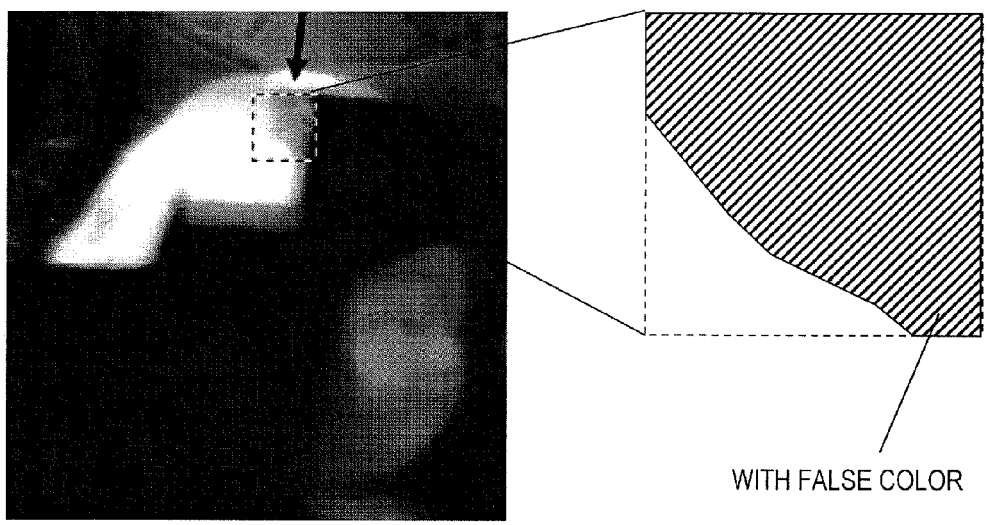
FIG. 19A shows an example of image generated with no determination on the saturation.
Figure 19B:
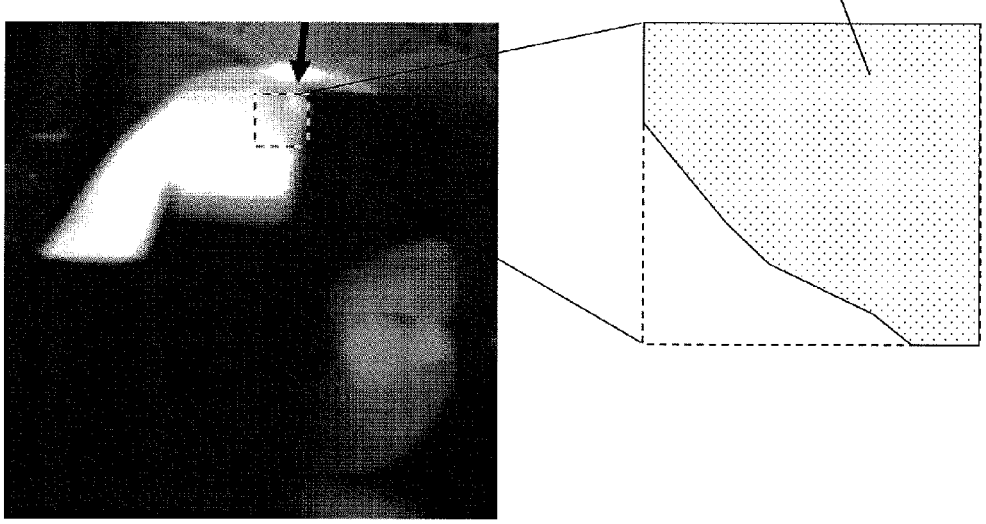
FIG. 19B shows an example of image obtained as a result of performing the processing in Embodiment 1.

Now, results of the processing performed on a natural image will be described. FIGS. 19A and 19B show a photographic image of a head of a doll (converted from an RGB color image to a luminance image). At the time of shooting, G is saturated in a part of the ribbon in the head, i.e., a rectangular area enclosed by the dashed line (indicated by the arrow; an enlarged view is shown on the right). The image shown in FIG. 19A is generated with no determination on the saturation. In the rectangular area enclosed by the dashed line, a color different from the surrounding color of the ribbon (white) is generated and the image is darker (hatched area in the enlarged view). FIG. 19B shows the result of performing the processing in this embodiment.

As a result of generating an image with the constraint by the first condition being suppressed based on the determination result that saturation has occurred, the false color is suppressed and the image is made brighter than that in FIG.

19A. Substantially the same brightness as that of the surrounding ribbon (hatched area in the enlarged view) is obtained.

As described above, according to processing in this embodiment, when a moving image having high temporal and spatial resolutions is to be generated by combining moving images having different temporal and spatial resolutions and different colors, an image with the deterioration of image quality being suppressed can be generated even from acquired images including saturation or blocked up shadows. As a result, in the generated image, the range of gray scales (dynamic range) which can be represented by the acquired images is exceeded in the brighter direction in the saturated area and in the darker direction in the blocked-up-shadowed area. As can be seen, this embodiment in which color images having different dynamic ranges are combined provides an effect of generating an image having an enlarged dynamic range.

(Embodiment 2)

Figure 20:
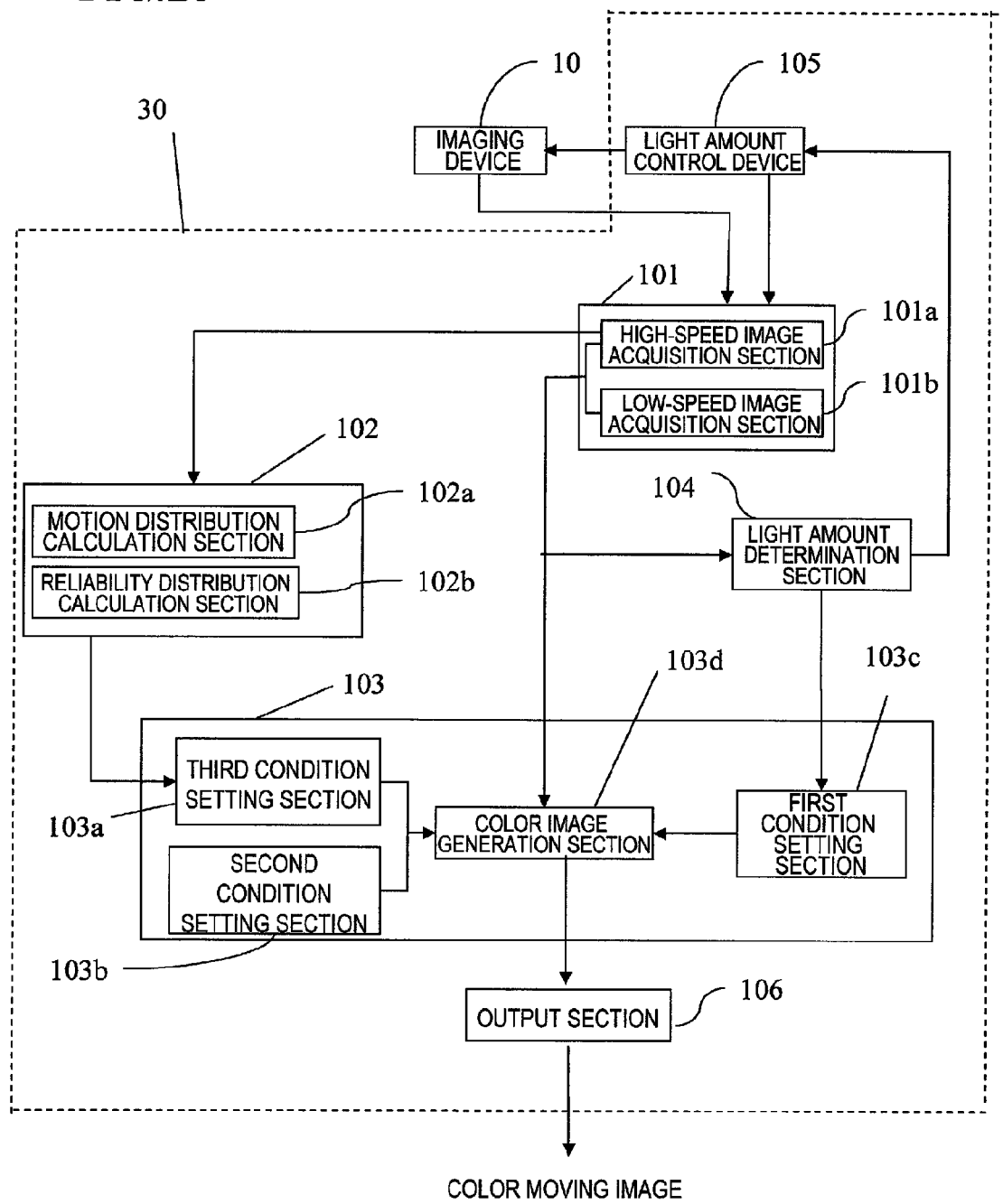
FIG. 20 is a functional block diagram showing an internal structure of an image generation device 30 in Embodiment 2.

Embodiment 2 of the present invention will be described. FIG. 20 is a functional block diagram showing an internal structure of an image generation device 30 in Embodiment 2. The structure and the operation of the functional blocks are substantially the same as those of Embodiment 1, except that a light amount control section 105 is newly added. The light amount control section 105 controls the exposure value used by the imaging device 10 for imaging a moving image. The exposure value is controlled based on the determination performed by the light amount determination section 104. Specifically, the exposure value can be controlled by changing the exposure time for each color image.

Figure 21:
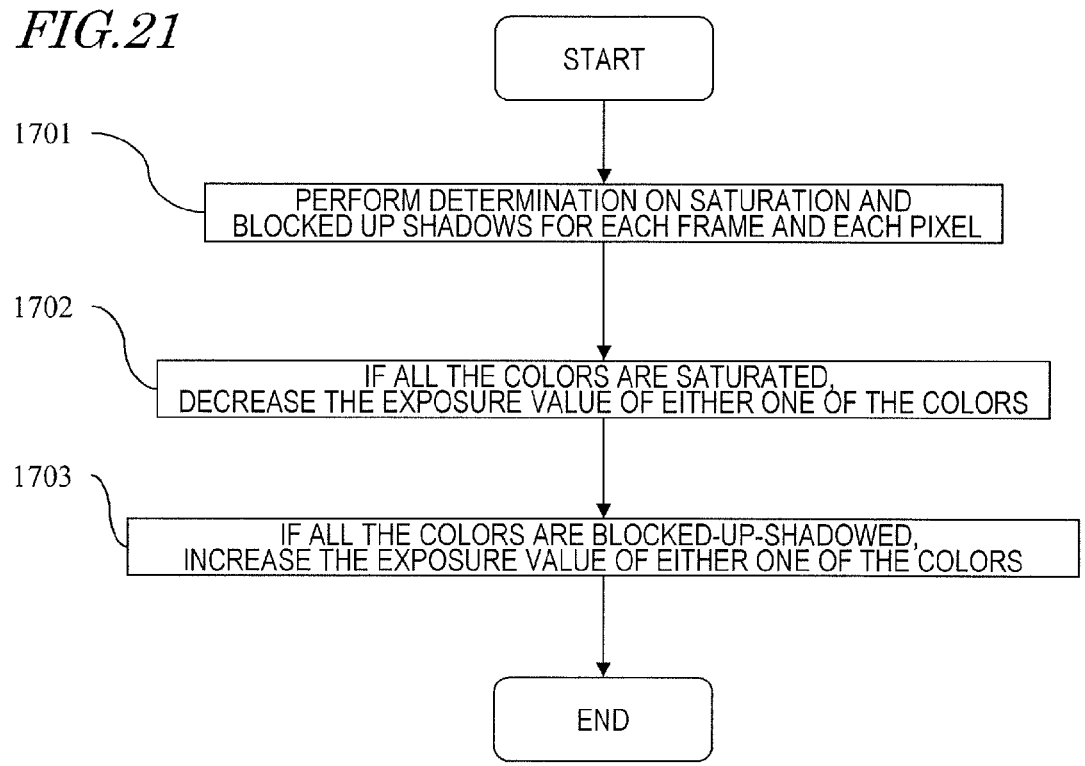
FIG. 21 is a flowchart showing a processing procedure of light amount control.

With reference to a flowchart in FIG. 21, an operation of the exposure value control will be described. FIG. 21 is a flowchart showing a procedure of light amount control processing. First, in step 1701, the light amount determination section 104 performs determination on saturation and blocked up shadows for each frame and each pixel. Next, in step 1702, if the result of the determination performed by the light amount determination section 104 indicates that all the colors at the same pixel position in the frames are saturated, the light amount control section 105 decreases the exposure value of either one of the colors (e.g., G). Next, in step 1703, if the result of the determination performed by the light amount determination section 104 indicates that all the colors at the same pixel position in the frames are blocked-up-shadowed, the light amount control section 105 increases the exposure value of either one of the colors (e.g., G).

As described above, by controlling the exposure amount of G, which contributes much to the luminance component of the image, the saturation of a luminance component, which generally has a large amount of information, is suppressed and thus information can be obtained.

The control of the exposure value may be performed in units of pixel or in units of RGB color image. When all the colors are saturated, the exposure value of either one of the colors is decreased as described above. Owing to this, an image in which the saturation of at least one color is suppressed is obtained. Therefore, the above-described effect of Embodiment 1 is more easily provided. Namely, in an area in which all the colors are saturated and so the constraint by the first condition is suppressed, a color image with no saturation is generated. Owing to this, another constraining condition (constraint on the temporal and spatial continuity, etc.) can be set based on image information of a non-saturated color. Therefore, the image quality is expected to be higher than in the case where all the colors are saturated. It is possible to decrease the exposure values of all the colors so that none of the colors is saturated. However, this causes blocked up shadows to arise easily. When the exposure value of either one of the colors is decreased as in this embodiment, the blocked up shadows in the target moving image are suppressed owing to the effect of Embodiment 1 and so an image having an enlarged dynamic range can be generated.

Similarly, in the case where all the colors are blocked-up-shadowed, the exposure value of either one of the colors is increased. Owing to this, an image in which at least one color is not blocked-up-shadowed is obtained. Therefore, the effect by the structure of Embodiment 1 is more easily provided. Namely, in an area in which all the colors are blocked-up-shadowed and so the constraint by the first condition is suppressed, a color image with no blocked up shadows is generated. Owing to this, another constraining condition (constraint on the temporal and spatial continuity, etc.) can be set based on image information of a non-blocked-up-shadowed color. Therefore, the image quality is expected to be higher than in the case where all the colors are blocked-up-shadowed. It is possible to increase the exposure values of all the colors so that none of the colors is blocked-up-shadowed. However, this causes saturation to occur easily. When the exposure value of either one of the colors is increased as in this embodiment, the saturation in the target moving image is suppressed owing to the effect of Embodiment 1 and so an image having an enlarged dynamic range can be generated.

(Embodiment 3)

Figure 22:
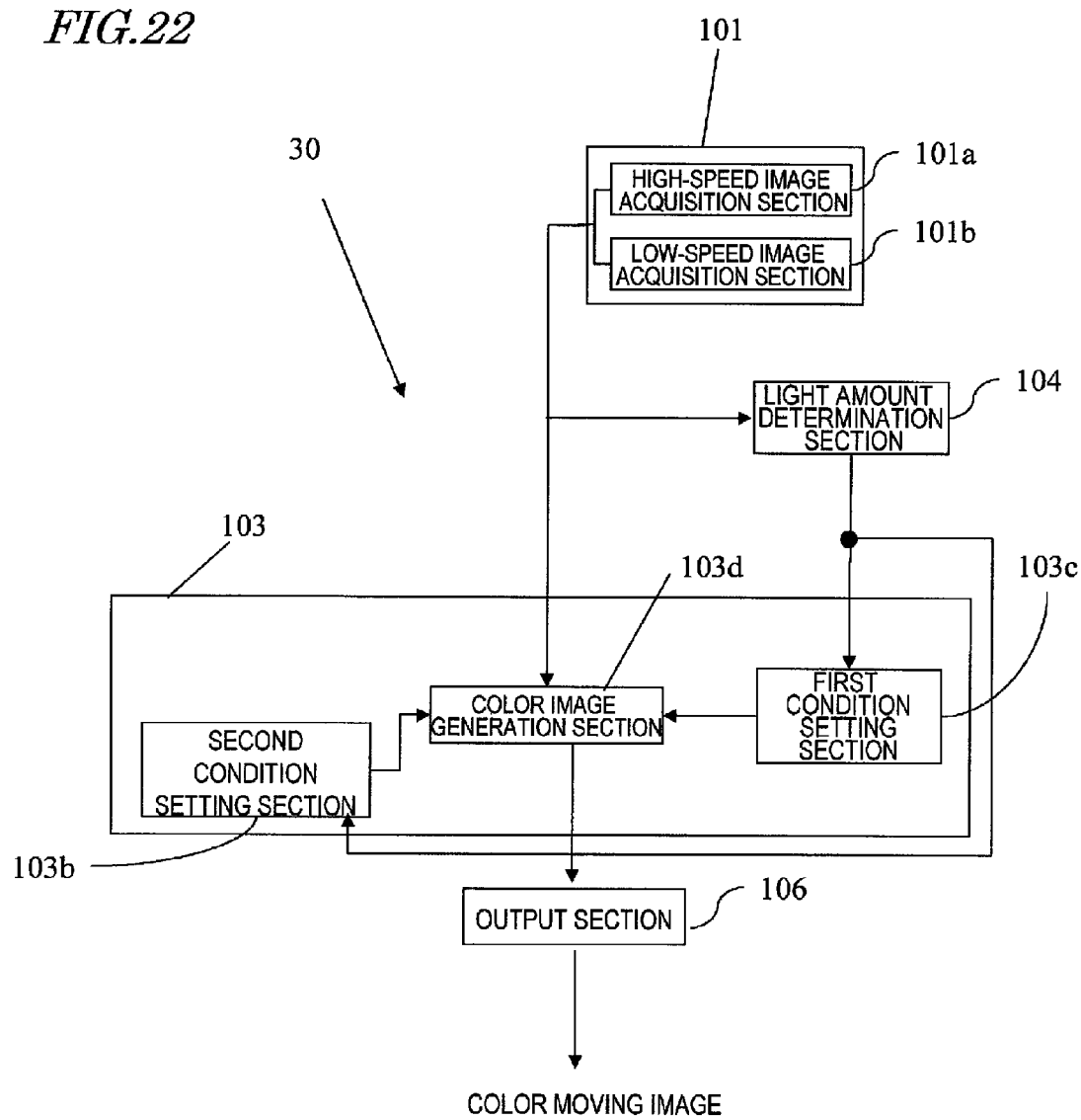
FIG. 22 is a functional block diagram showing an internal structure of an image generation device 30 in Embodiment 3.
Figure 23:
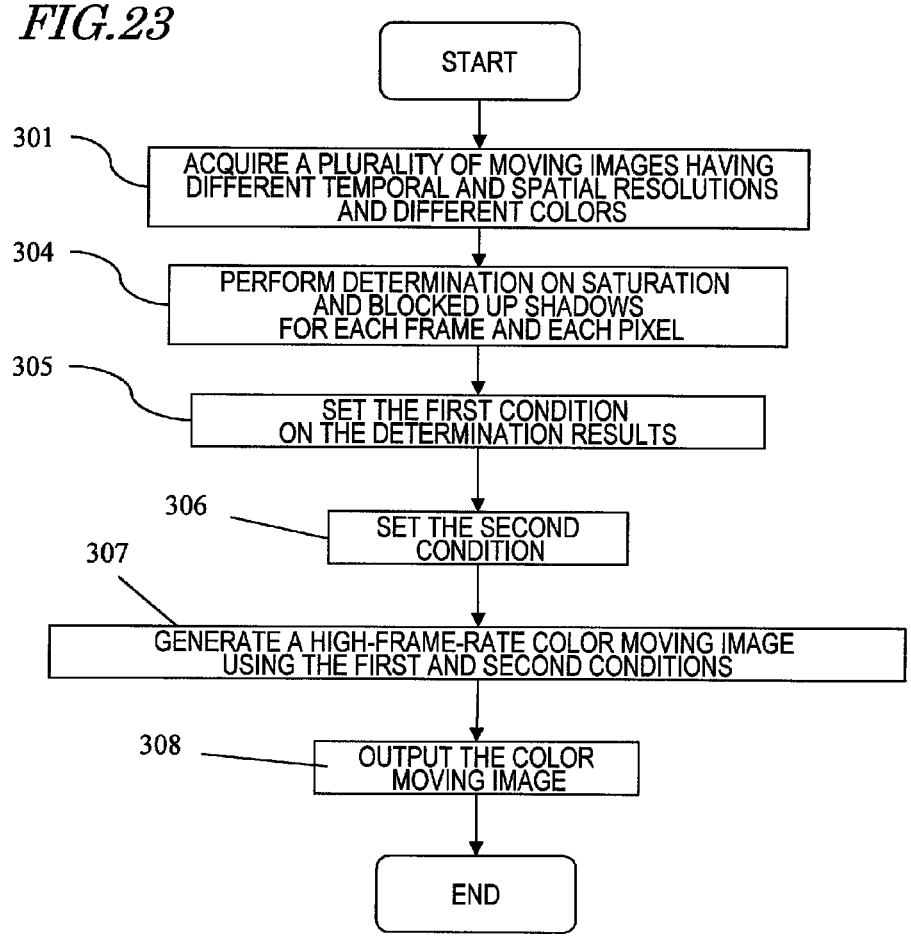
FIG. 23 is a flowchart showing a processing procedure executed by the image generation device 30 in Embodiment 3.

FIG. 22 is a functional block diagram showing an internal structure of an image generation device 30 in this embodiment. FIG. 23 is a flowchart showing a processing procedure performed by the image generation device 30 in this embodiment. The structure and the operation of the image generation device 30 are substantially the same as those of Embodiment 1, except that the image generation device 30 in this embodiment does not include the motion detection section. Thus, the flowchart shown in FIG. 23 does not include the processing regarding the motion of the image (steps 302 and 303 in FIG. 3).

The color image generation section 103d generates a new moving image using the condition set by the first condition setting section 103c and the condition set by the second condition setting section 103b. Even when the constraint on motion is not used, the quality of the target moving image corresponding to the saturated area can be improved when the light determination section performs determination on saturation or blocked up shadows and the first condition is set based on the determination results.

Figure 24:
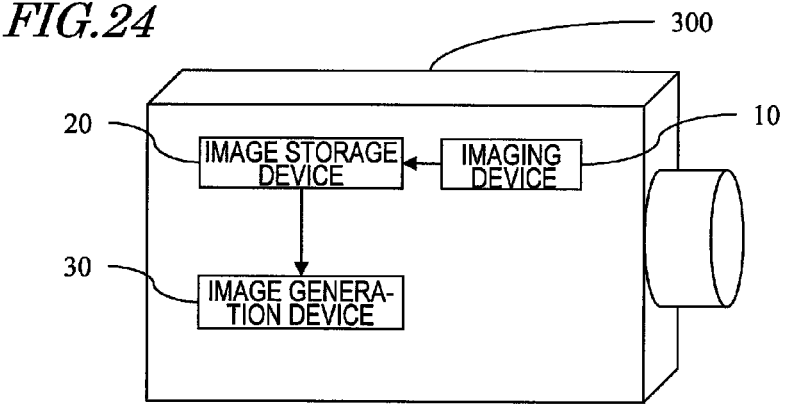
FIG. 24 shows a specific example of an image generation system which does not include the display device.

So far, the image generation system 100 including the display device 40 has been described. However, as in a video camera 300 shown in FIG. 24, the display device 40 may be removed from the image generation system shown in FIG. 1. A camera with a moving image recording and reproduction function which has a structure of the video camera 300 shown in FIG. 24 and also the display device 40 is encompassed in the structure shown in FIG. 1 and the like.

Figure 25:
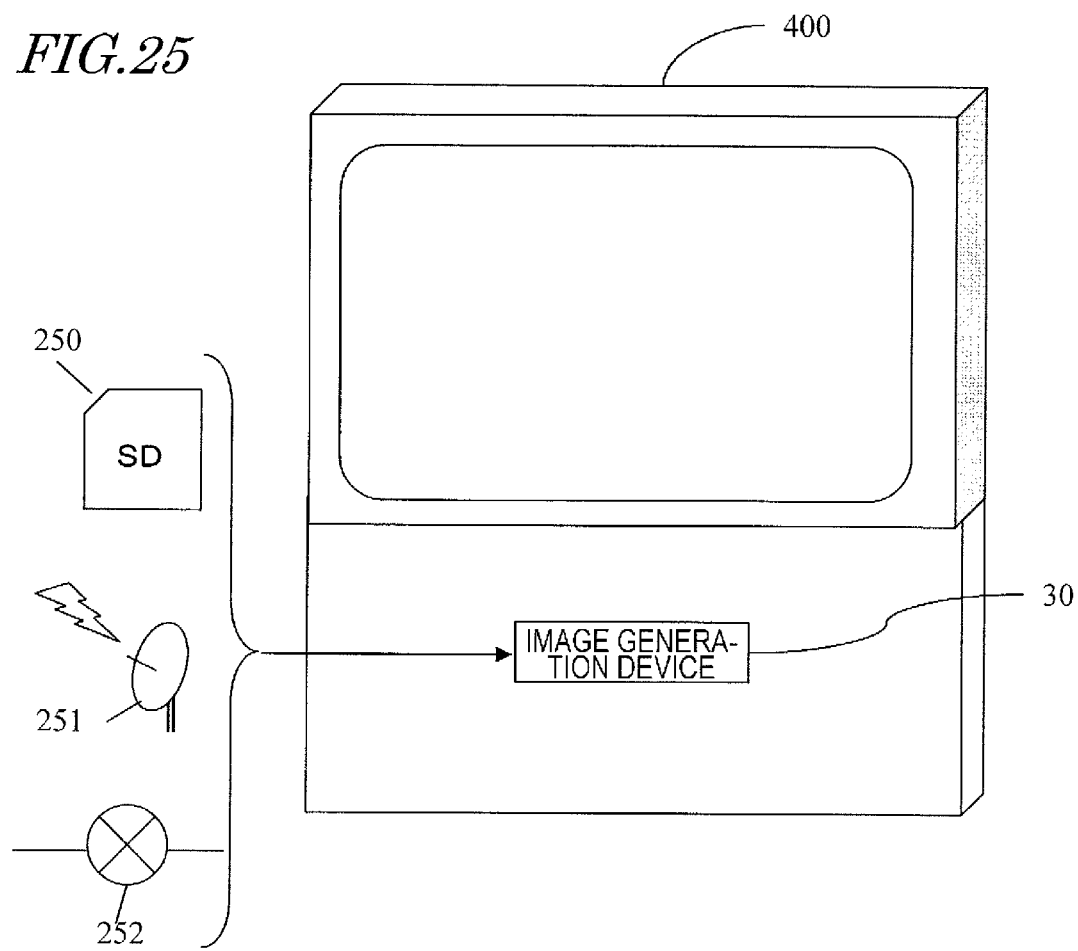
FIG. 25 shows a specific example of an image generation system which does not include the imaging device.

Alternatively, as in a display device 400 (e.g., TV) shown in FIG. 25, the imaging device 10 may be removed from the image generation system shown in FIG. 1. Such a display device 400 receives a moving image including a plurality of colors of components and can generate and display a target moving image having an improved frame rate. Even where the imaging device 10 is not included, such a display device is encompassed in the image generation system 100.

The display device 400 can receive the "moving image including a plurality of colors of components" in any of various methods. For example, a moving image including a plurality of colors of components may be extracted from moving image data recorded in advance on a semiconductor memory card (e.g., an SD card) 250, or extracted from the broadcast waves using an antenna 251. Alternatively, the moving image may be acquired via a network 252 such as the Internet or the like. In the display device 400, two or all of the semiconductor card 250, the antenna 251 and the network 252 may be usable.

In order to perform the processing of generating a new moving image in, for example, Embodiment 1 by the display device 400 shown in FIG. 25, the image generation device 30 needs information on shooting conditions such as the exposing timing (FIGS. 7A and 7B) of a moving image of each color component. Thus, the image acquisition section 101 receives the video signal 210 of the format shown in FIG. 4C to acquire the information on the shooting conditions from the identification header 210a and thus can acquire the moving image data 210b.

As long as the image generation device 30 can receive the video signal 210 shown in FIG. 4C, any method for sending the video signal 210 is usable. For example, the video signal 210 shown in FIG. 4C may be packetized and transmitted on broadcast waves to perform network communication.

In the above, embodiments of the image processing device according to the present invention has been described. The above-described embodiments are merely examples and the present invention is not limited to these embodiments. Any modification made to the embodiments by a person of ordinary skill in the art is encompassed in the scope of the present invention.

A part or the entirety of the image generation processing performed by the image processing device according to the present invention may be realized by a dedicated hardware device. Alternatively, the image generation processing according to the present invention may be performed by a CPU built in a computer terminal, a communication device installed in a wireless base station or the like, or a stand-alone general-purpose computer or the like executing a prescribed computer program. In such a computer program, the processing procedure shown in any of the flowcharts shown in the figures is defined. The CPU which has executed the computer program operates itself in accordance with the processing procedure, or instructs other elements shown in the figures to operate, to cause the image processing device to operate in accordance with the processing procedure.

The present invention is directed to an image generation technology of generating a new moving image from a plurality of moving images. Especially, the present invention is usable for an image generation device for generating a high-speed high-resolution moving image from a high-speed low-resolution moving image and a low-speed high-resolution moving image (or still image); or a video device or system, a video synthesis device, a video editing device, or an image recovery device incorporating such an image generation device; or an image recovery program or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image generation device for generating, from a first moving image, which is a moving image of a first color component of a subject, and a second moving image, which is a moving image of a second color component of the subject, a new moving image representing the subject, the image generation device comprising:
    an image acquisition section for acquiring the first moving image and the second moving image having different resolutions and different frame rates or different exposure times from each other;
    a light amount determination section for determining, based on a pixel value of each of pixels in each of frame images of the first moving image and the second moving image, whether or not each pixel is saturated or blocked-up-shadowed; and
    an image processing section for generating, from the first moving image and the second moving image, a new moving image having a frame rate which is equal to or higher than the frame rate of the first moving image and the second moving image and having a resolution of each frame image which is equal to or higher than the resolution of the first moving image and the second moving image; wherein for a pixel not determined by the light amount determination section as being saturated or being blocked-up-shadowed, the image processing section generates a new moving image fulfilling a first condition which indicates that an error between a pixel value of each of the acquired first moving image and second moving image and a sum of pixel values of frame images of the new moving image corresponding to the pixel value temporally and spatially is smaller than a prescribed value, and for a pixel determined by the light amount determination section as being saturated or being blocked-up-shadowed, the image processing section generates a new moving image which does not fulfill the first condition.

2. The image generation device of claim 1, wherein the first color component is at least one of red and blue, and the second color component is green.

3. The image generation device of claim 1, wherein when a light amount at each pixel is equal to or greater than a predefined saturation value, the light amount determination section determines that the pixel is saturated.

4. The image generation device of claim 1, wherein when a light amount at each pixel is equal to or less than a predefined value for blocked up shadows, the light amount determination section determines that the pixel is blocked-up-shadowed.

5. The image generation device of claim 3, wherein the saturation value is set for each of the first color component and the second color component.

6. The image generation device of claim 4, wherein the value for the blocked up shadows is set for each of the first color component and the second color component.

7. The image generation device of claim 1, wherein when the light amount determination section determines that a pixel is saturated, the image processing section decreases the pixel value of the pixel, and when the light amount determination section determines that a pixel is block-up-shadowed, the image processing section increases the pixel value of the pixel.

8. The image generation device of claim 1, further comprising a second condition setting section for setting a second condition regarding temporal and spatial continuity which indicates that colors of pixels adjacent to each other temporally and spatially in the new moving image to be generated need to be continuous;
    wherein the image processing section generates a new moving image fulfilling the second condition.

9. The image generation device of claim 8, wherein the second condition setting section sets the second condition regarding the temporal and spatial continuity separately for a signal strength and a color of the pixel.

10. The image generation device of claim 9, wherein the second condition setting section determines a weight to be applied, at a pixel position of each pixel in the new moving image, to the second condition to be set, and sets the second condition while decreasing the weight at the pixel position where a spatial differential value of the acquired first or second moving image is large.

11. The image generation device of claim 9, wherein the second condition setting section sets the second condition while making the weight for the temporal and spatial continuity of the color of the pixel larger than the weight for the temporal and spatial continuity of the signal strength of the pixel.

12. The image generation device of claim 8, wherein the second condition setting section sets the second condition regarding the temporal and spatial continuity for each of a direction chosen in accordance with the magnitude of dispersion of the pixel values in a color space of each of the acquired images and a direction perpendicular to the chosen direction.

13. The image generation device of claim 8, wherein the second condition setting section sets the second condition for the pixel position of the pixel determined by the light amount determination section as being saturated or blocked-up-shadowed more strongly than for the pixel position of the pixel not determined by the light amount determination section as being saturated or blocked-up-shadowed.

14. The image generation device of claim 1, further comprising a light amount control section for adjusting an exposure value of an imaging device for imaging the first moving image and the second moving image;
wherein when the light determination section determines that all the colors at the same position of the frames are saturated regarding each of the first moving image and the second moving image, the light amount control section decreases the exposure value for acquiring a moving image of a part of the color components.

15. The image generation device of claim 14, wherein when the light determination section determines that all the colors at the same position of the frames are saturated, the light amount control section decreases the exposure value of the imaging device at the time of imaging a moving image of at least one color component.

16. The image generation device of claim 1, further comprising:
a motion detection section for detecting a motion of at least one of the acquired images; and
a third condition setting section for setting a third condition which indicates that pixel values along a motion vector in the new moving image to be generated match each other based on a result of the motion detection;
wherein the image processing section generates a new moving image fulfilling the third condition.

17. The image generation device of claim 16, wherein the third conditions setting section sets the third condition for the pixel position of the pixel determined by the light amount determination section as being saturated or blocked-up-shadowed more strongly than for the pixel position of the pixel not determined by the light amount determination section as being saturated or blocked-up-shadowed.

18. An image generation system, comprising:
an imaging device;
a storage device for recording an image shot by the imaging device; and
the image generation device of claim 1 for generating the new moving image using the image in the storage device.

19. An image generation system, comprising:
the image generation device of claim 1; and
a display device for displaying the new moving image generated by the image generation device.

20. The image generation system of claim 19, wherein the image generation device acquires a signal of each of the first moving image and the second moving image via at least one of a memory card, an antenna and a network.

21. An image generation method for generating, from a first moving image, which is a moving image of a first color component of a subject, and a second moving image, which is a moving image of a second color component of the subject, a new moving image representing the subject, the image generation method comprising the steps of:
acquiring the first moving image and the second moving image having different resolutions and different frame rates or different exposure times from each other;
determining, based on a pixel value of each of pixels in each of frame images of the first moving image and the second moving image, whether or not each pixel is saturated or blocked-up-shadowed; and
generating, from the first moving image and the second moving image, a new image having a frame rate which is equal to or higher than the frame rate of the first moving image and the second moving image and having a resolution of the frame images which is equal to or higher than the resolution of the first moving image and the second moving image; wherein for a pixel not determined in the step of determining as being saturated or being blocked-up-shadowed, the step of generating a new image generates a new moving image fulfilling a first condition which indicates that an error between a pixel value of each of the acquired first moving image and second moving image and a sum of pixel values, of frame images of the new moving image, corresponding to the pixel values temporally and spatially is smaller than a prescribed value, and for a pixel determined in the step of determining as being saturated or being blocked-up-shadowed, the step of generating a new image generates a new moving image which does not fulfill the first condition.

22. A computer program, stored on a non-transitory computer-readable storage medium, executable by a computer of an image generation device for generating, from a first moving image, which is a moving image of a first color component of a subject, and a second moving image, which is a moving image of a second color component of the subject, a new moving image representing the subject, the computer program causing the computer to execute the steps of:
acquiring the first moving image and the second moving image having different resolutions and different frame rates or different exposure times from each other;
determining, based on a pixel value of each of pixels in each of frame images of the first moving image and the second moving image, whether or not each pixel is saturated or blocked-up-shadowed; and
generating, from the first moving image and the second moving image, a new image having a frame rate which is equal to or higher than the frame rate of the first moving image and the second moving image and having a resolution of the frame images which is equal to or higher than the resolution of the first moving image and the second moving image; wherein for a pixel not determined in the step of determining as being saturated or being blocked-up-shadowed, the step of generating a new image generates a new moving image fulfilling a first condition which indicates that an error between a pixel value of each of the acquired first moving image and second moving image and a sum of pixel values, of frame images of the new moving image, corresponding to the pixel values temporally and spatially is smaller than a prescribed value, and for a pixel determined in the step of determining as being saturated or being blocked-up-shadowed, the step of generating a new image generates a new moving image which does not fulfill the first condition.

* * * * *